United States Patent
Divan

(10) Patent No.: US 9,071,048 B2
(45) Date of Patent: Jun. 30, 2015

(54) VOLTAGE SURGE AND OVERVOLTAGE PROTECTION BY DISTRIBUTED CLAMPING DEVICE DISSIPATION

(71) Applicant: Georgia Tech Research Corporation, Atlanta, GA (US)

(72) Inventor: Deepakraj M. Divan, San Jose, CA (US)

(73) Assignee: Georgia Tech Research Corporation, Atlanta, GA (US)

(*) Notice: Subject to any disclaimer, the term of this patent is extended or adjusted under 35 U.S.C. 154(b) by 0 days.

(21) Appl. No.: 14/072,362

(22) Filed: Nov. 5, 2013

(65) Prior Publication Data

US 2014/0055895 A1    Feb. 27, 2014

Related U.S. Application Data

(63) Continuation of application No. 13/679,705, filed on Nov. 16, 2012, now Pat. No. 8,593,776, which is a continuation of application No. 13/098,226, filed on Apr. 29, 2011, now Pat. No. 8,335,068, which is a (Continued)

(51) Int. Cl.
*H02H 9/00* (2006.01)
*H02H 9/04* (2006.01)
*H02H 3/20* (2006.01)

(52) U.S. Cl.
CPC ................ *H02H 9/04* (2013.01); *H02H 3/207* (2013.01); *H02H 9/002* (2013.01); *H02H 9/042* (2013.01); *H02H 9/044* (2013.01)

(58) Field of Classification Search
CPC .................................................... H01L 23/552

USPC ........................................................ 361/118
See application file for complete search history.

(56) References Cited

U.S. PATENT DOCUMENTS 3,109,930 A    11/1963    MacDonald
3,558,952 A     1/1971    Forbes (Continued)

FOREIGN PATENT DOCUMENTS

EP    0 708 515 A1    4/1996
EP    0 986 158 A1    3/2000

(Continued)

OTHER PUBLICATIONS

Duran-Gomez, Jose Luis, et al., An Approach to Achieve Ride-Through of an Adjustable-Speed Drive with Flyback Converter Modules Powered by Super Capacitors, IEEE Transactions on Industry Applications, Mar./Apr. 2002, pp. 514-522, vol. 38, No. 2, IEEE, USA.

(Continued)

*Primary Examiner* — Stephen W Jackson
(74) *Attorney, Agent, or Firm* — Morris, Manning & Martin, LLP; John R. Harris

(57) ABSTRACT

Disclosed are various embodiments of voltage protectors that include a first voltage clamping device configured to clamp a voltage of an input power applied to an electrical load, and a second voltage clamping device configured to clamp the voltage applied to the electrical load. A series inductance separates the first and second voltage clamping devices. Also, a switching element is employed to selectively establish a direct coupling of the input power to the electrical load, where a circuit is employed to control the operation of the switching element.

38 Claims, 13 Drawing Sheets

Related U.S. Application Data continuation of application No. 12/062,953, filed on Apr. 4, 2008, now Pat. No. 7,957,117.

(60) Provisional application No. 60/910,355, filed on Apr. 5, 2007.

(56) References Cited

U.S. PATENT DOCUMENTS

| | | | |
|---|---|---|---|
| 3,935,511 | A | 1/1976 | Boulanger et al. |
| 3,935,527 | A | 1/1976 | Michelet et al. |
| 3,982,137 | A | 9/1976 | Penrod |
| 4,031,463 | A | 6/1977 | Norberg |
| 4,183,071 | A | 1/1980 | Russell |
| 4,250,531 | A | 2/1981 | Ahrens |
| 4,328,459 | A | 5/1982 | McLeod, Jr. |
| 4,396,882 | A | 8/1983 | Kellenbenz |
| 4,479,118 | A | 10/1984 | Cole, Jr. |
| 4,555,741 | A | 11/1985 | Masaki |
| 4,560,887 | A | 12/1985 | Schneider |
| 4,675,772 | A | 6/1987 | Epstein |
| 4,691,274 | A | 9/1987 | Matouk et al. |
| 4,782,241 | A | 11/1988 | Baker et al. |
| 4,858,054 | A | 8/1989 | Franklin |
| 4,924,342 | A | 5/1990 | Lee |
| 4,939,437 | A | 7/1990 | Farag et al. |
| 5,030,844 | A | 7/1991 | Li et al. |
| 5,032,738 | A | 7/1991 | Vithayathil |
| 5,063,303 | A | 11/1991 | Sackman et al. |
| 5,257,157 | A | 10/1993 | Epstein |
| 5,379,177 | A | 1/1995 | Bird |
| 5,386,183 | A | 1/1995 | Cronvich et al. |
| 5,448,442 | A | 9/1995 | Farag et al. |
| 5,519,264 | A | 5/1996 | Heyden et al. |
| 5,519,295 | A | 5/1996 | Jatnieks |
| 5,537,021 | A | 7/1996 | Weinberg et al. |
| 5,563,459 | A | 10/1996 | Kurosawa et al. |
| 5,619,127 | A | 4/1997 | Warizaya |
| 5,627,738 | A | 5/1997 | Lubomirsky et al. |
| 5,642,007 | A | 6/1997 | Gyugyi et al. |
| 5,689,395 | A | 11/1997 | Duffy et al. |
| 5,737,161 | A | 4/1998 | Thomas |
| 5,745,322 | A | 4/1998 | Duffy et al. |
| 5,864,458 | A | 1/1999 | Duffy et al. |
| 5,886,429 | A | 3/1999 | Grady et al. |
| 5,894,396 | A | 4/1999 | Kim |
| 5,907,192 | A | 5/1999 | Lyons et al. |
| 6,005,362 | A | 12/1999 | Enjeti et al. |
| 6,021,035 | A | 2/2000 | Larsen et al. |
| 6,046,921 | A | 4/2000 | Tracewell et al. |
| 6,112,136 | A | 8/2000 | Paul et al. |
| 6,118,676 | A | 9/2000 | Divan et al. |
| 6,163,469 | A | 12/2000 | Yuki |
| 6,178,080 | B1 | 1/2001 | Wilken et al. |
| 6,184,593 | B1 | 2/2001 | Jungreis |
| 6,456,097 | B1 | 9/2002 | Sutherland |
| 6,538,864 | B2 | 3/2003 | Mullner |
| 6,597,144 | B2 | 7/2003 | Pearson et al. |
| 6,744,612 | B2 | 6/2004 | Chen |
| 6,744,613 | B2 | 6/2004 | McCook et al. |
| 6,862,201 | B2 | 3/2005 | Hodge, Jr. |
| 7,012,793 | B2 | 3/2006 | Cheevanantachai et al. |
| 7,049,710 | B2 | 5/2006 | Dahlman |
| 7,099,135 | B2 | 8/2006 | Ball et al. |
| 7,184,279 | B2 | 2/2007 | Lee |
| 7,355,294 | B2 | 4/2008 | Teichmann |
| 7,504,821 | B2 | 3/2009 | Shuey |
| 7,525,777 | B2 | 4/2009 | Aromin |
| 7,541,696 | B2 | 6/2009 | Dawley |
| 7,630,185 | B2 | 12/2009 | Fiesoli et al. |
| 7,957,117 | B2 * | 6/2011 | Divan ........................ 361/118 |
| 7,977,928 | B2 | 7/2011 | Farenbruch |
| 8,035,938 | B2 | 10/2011 | Divan |
| 2001/0021091 | A1 | 9/2001 | Weichler |
| 2002/0012261 | A1 | 1/2002 | Moindron |
| 2002/0122318 | A1 | 9/2002 | Guerrera |
| 2002/0149891 | A1 | 10/2002 | Neiger et al. |
| 2003/0107859 | A1 | 6/2003 | Pan et al. |
| 2003/0222747 | A1 | 12/2003 | Perkinson et al. |
| 2004/0201931 | A1 | 10/2004 | Korcharz et al. |
| 2005/0088792 | A1 | 4/2005 | Mechanic et al. |
| 2010/0091421 | A1 | 4/2010 | Lee |

FOREIGN PATENT DOCUMENTS

| | | |
|---|---|---|
| FR | 2 197 258 | 3/1974 |
| GB | 1076078 | 7/1967 |
| GB | 2284100 | 5/1995 |
| JP | 61-77634 | 5/1986 |
| JP | 05-049167 | 2/1993 |
| JP | 05-252650 A | 9/1993 |
| JP | 2001-136657 | 5/2001 |
| JP | 2003-259648 | 9/2003 |
| JP | 2004-304876 | 10/2004 |
| WO | WO 00/59087 A1 | 10/2000 |
| WO | PCT/US05/38471 | 3/2006 |

OTHER PUBLICATIONS

Electrotek, Voltage Sag Studies, http://www.electrotek.com/voltsag.htm. Feb. 16, 2006, pp. 1-5, Electrotek Concepts, USA.

Fischer, F. V., Applied Power Electronics in the Field of Voltage Dip-Proofing, http://www.measurlogic.com/Resources/PowerQuality_book.pdf, May 16, 2002, pp. 1-12, Dip-Proofing Technologies Inc., USA.

Stratford, J., et al., Applying Voltage Dip Proofing to Provide Ride-Through, http://www.electricenergyonline.com/?page=show_article&mag=11&article=81, Feb. 2003, pp. 1-8, Electric Energy Publications Inc., USA.

\* cited by examiner

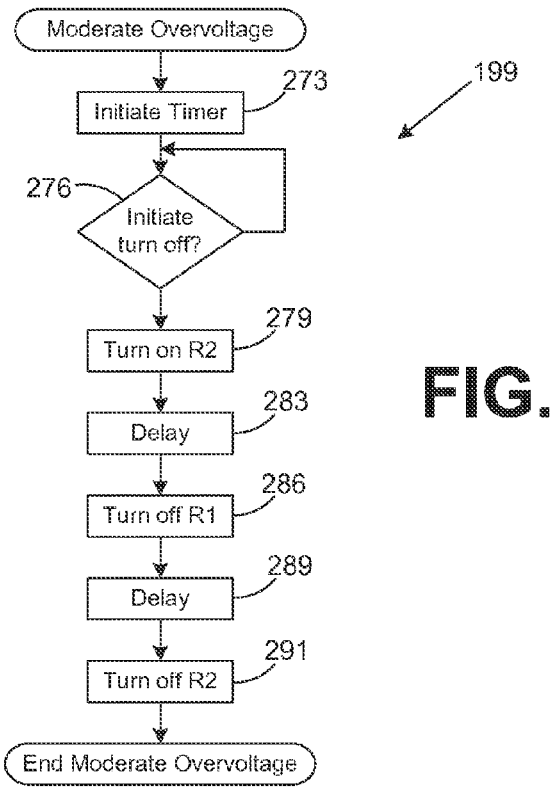
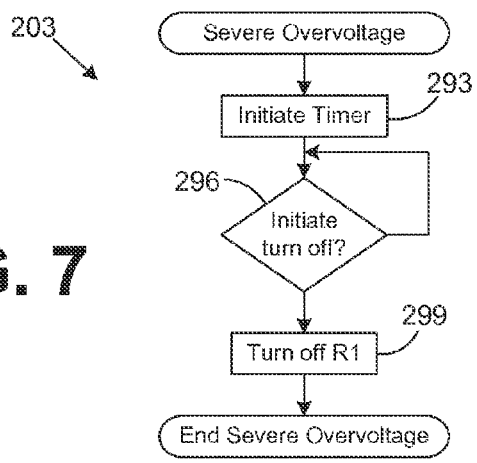
FIG. 6
FIG. 7

VOLTAGE SURGE AND OVERVOLTAGE PROTECTION BY DISTRIBUTED CLAMPING DEVICE DISSIPATION

CROSS REFERENCE TO RELATED CASES

This application is a continuation of U.S. patent application Ser. No. 13/679,705, filed Nov. 16, 2012, entitled "VOLTAGE SURGE AND OVERVOLTAGE PROTECTION USING PRESTORED VOLTAGE TIME PROFILES", now U.S. Pat. No 8,593,776, which is a continuation of U.S. patent application Ser. No. 13/098,226, filed Apr. 29, 2011, entitled VOLTAGE SURGE AND OVERVOLTAGE PROTECTION USING PRESTORED VOLTAGE TIME PROFILES", now U.S. Pat. No. 8,335,068, which is a continuation of U.S. patent application Ser. No. 12/062,953, filed Apr. 4, 2008, entitled "VOLTAGE SURGE AND OVERVOLTAGE PROTECTION," by Deepakraj M. Divan, now U.S. Pat. No. 7,957 117, which claims the benefit pursuant to 35 U.S.C. §119(e) of and priority to U.S. Provisional Patent Application No. 60/910,355 entitled "PREVENTING DAMAGE TO TRANSIENT VOLTAGE SURGE SUPPRESSORS DUE TO OVER VOLTAGES" filed on Apr. 5, 2007, the disclosures of which are incorporated herein by reference in their entireties.

This application is also related to the following U.S. patent applications, each of which is a continuation of U.S. patent application Ser. No. 12/062,953, filed Apr. 4, 2008, now U.S. Pat. No. 7,957,117:

U.S. patent application Ser. No. 13/098,105, entitled "Voltage Surge and Overvoltage Protection with RC Snubber Current Limiter", filed on Apr. 29, 2011, now U.S. Pat. No. 8,325,455;

U.S. patent application Ser. No. 13/098,169, entitled "Voltage Surge and Overvoltage Protection with Sequenced Component Switching", filed on Apr. 29, 2011, now U.S. Pat. No. 8,335,067; and U.S. patent application Ser. No. 13/098,214, entitled "Voltage Surge and Overvoltage Protection with Current Surge Protection", filed on Apr. 29, 2011, now U.S. Pat. No. 8,411,403.

BACKGROUND

Voltage surges created by lightning strikes and longer duration over-voltages experienced on a power distribution grid can result in significant damage to electronic equipment. Where a sustained overvoltage is severe, fires have been started resulting in significant loss of property. Existing surge protection devices, such as Transient Voltage Surge Suppressors (TVSS), are typically designed to handle short duration transients of 8-20 microseconds associated with lightning strikes. As a result, TVSS devices typically provide no protection against longer duration over-voltage disturbances, and can often be the cause of the fires and damage to equipment that have been reported.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIG. 6 is a flow chart that illustrates one example of a response of the voltage surge suppressor of FIG. 1 to a moderate overvoltage according to various embodiments of the present disclosure;

FIG. 7 is a flow chart that illustrates an example of a response of the voltage surge suppressor of FIG. 1 to a severe overvoltage according to various embodiments of the present disclosure;

DETAILED DESCRIPTION

Figure 1:
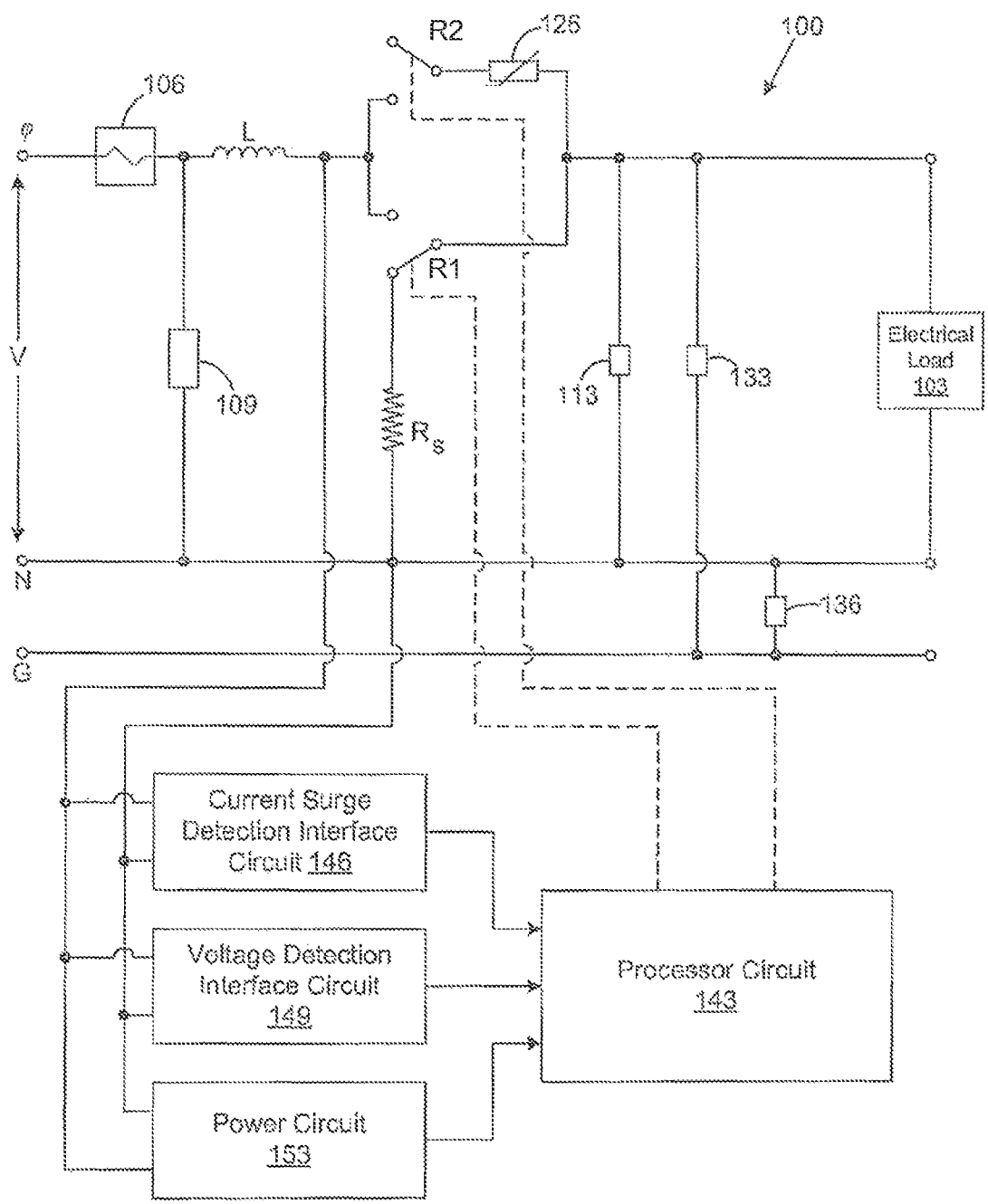
FIG. 1 is a schematic of one example of a voltage surge suppressor according to various embodiments of the present disclosure.

With reference to FIG. 1, shown is one example of a voltage protector 100 according to various embodiments of the present disclosure. The voltage protector 100 includes an input terminal through which an input power voltage V is received. The power voltage V comprises a nominal voltage that is a standard value, specified for various purposes such as power distribution on a power grid, i.e. 120/240 single phase, 480/277 Wye, 120/208 Wye or other specification. Nominal voltages may be generated at various frequencies such as 60 Hz., 50 Hz., 400 Hz., or any other frequency. Thus, a nominal voltage may be an AC voltages specified, for example, in terms of peak to peak voltage, RMS voltage, and/or frequency. Also, a nominal voltage may be a DC voltage specified in terms of a voltage magnitude.

From time to time, the power voltage V may experience an overvoltage that may last many milliseconds or even longer. Such overvoltages may be caused by a variety of incidents, including faults in the power distribution system or the switching of capacitors into and out of the power distribution grid for purposes of voltage regulation. Also, in split 240 volt single phase systems, for example, the loss of the neutral conductor due to a fault, cut conductor, or other problem can result in overvoltages. Still further, the power voltage V may experience voltage sags from time to time, resulting in potentially harmful inrush current into sensitive electronic equipment at the end of the voltage sag event.

The voltage protector 100 includes phase, neutral, and ground conductors that are used to route the power voltage V to an electrical load 103 that is coupled to the transient voltage surge suppressor 100. In this respect, the voltage protector 100 may be embodied in a power strip, a load center, or other location.

The voltage protector 100 includes a thermal fuse 106 that operates as a safety circuit interrupt as can be appreciated. The voltage protector 100 also includes first voltage clamping device 109 and a second voltage clamping device 113. As will be discussed further below, the voltage clamping level of the first voltage clamping device 109 is substantially higher than the voltage clamping level of the second voltage clamping device 113. The first voltage clamping device 109 is coupled from phase ϕ to neutral N at the power input of the voltage protector 100. The second voltage clamping device 113 is coupled from phase ϕ to neutral N at the power output of the voltage protector 100 in parallel with the electrical load 103 when coupled thereto.

The voltage protector 100 further comprises a series inductance L, a first switching element R1 and a second switching element R2. The series inductance L is positioned in the phase conductor between the first and second clamping devices 109 and 113. The first and second switching elements R1 and R2 are coupled in parallel to each other as shown. The first switching element R1 includes a first state and a second state. In the first state, the first switching element R1 couples the series inductance L directly to the electrical load 103. In a second state, the first switching element R1 couples a shunt resistance $R_S$ across the phase ϕ and neutral N conductors in parallel with the load 103. Where the electrical load 103 is inductive, the shunt resistance RS allows the inductive load to discharge and provides a pathway for leakage currents as can be appreciated.

The second switch element R2 includes a first state and a second state. In the first state, the second switch element R2 couples an impedance between the series inductance L and the electrical load 103. In this sense, the second switch element R2 adds an impedance to the electrical load 103. In a second state, the second switch element R2 is open. The first and second switching elements R1 and R2 may comprise, for example, relays, solid state switches such as thyristors, or other types of switching circuit elements.

Coupled to the second switching element R2 is an impedance 126 that comprises, for example, a negative temperature coefficient resistor (thermistor) or other impedance. In addition, the voltage protector 100 includes a voltage clamping device 133 coupled between phase ϕ and ground G, and a voltage clamping device 136 coupled between neutral N and ground G. The voltage clamping devices 109, 113, 133, and 136 may comprise, for example, metal oxide varistors, zener diodes, gas tubes, or other voltage clamping circuit dements.

Still further, the voltage protector 100 includes a processor circuit 143 that controls the operation of the first and second switching elements R1 and R2. The voltage protector 100 also includes a current surge detection interface circuit 146, a voltage detection interface circuit 149, and a power circuit 153. The current surge detection interface circuit 146, the voltage detection interface circuit 149, and the power circuit 153 each receive an input voltage taken across the phase ϕ and neutral N conductors between the inductance L and the first and second switches R2.

The current surge detection interface circuit 146 detects whether a voltage sag exists that can result in a potentially damaging current surge.

The voltage detection interface circuit 149 detects the power voltage V and provides an appropriate signal to the processor circuit 143. By knowing the voltage at any given moment, the processor circuit 143 can take such action as is deemed necessary to protect components of the voltage protector 100 and the electrical load 103 from voltage surge and voltage sag activity as will be described. The current surge detection interface circuit 146 and the voltage detection interface circuit 149 are designed to provide a fast response to overvoltage and voltage sag conditions. The microprocessor is selected so as to provide for fast switching of the switching elements R1 and R2.

The power circuit 153 generates DC power that is applied to the processor circuit 143 to power its operation as can be appreciated.

Figure 2:
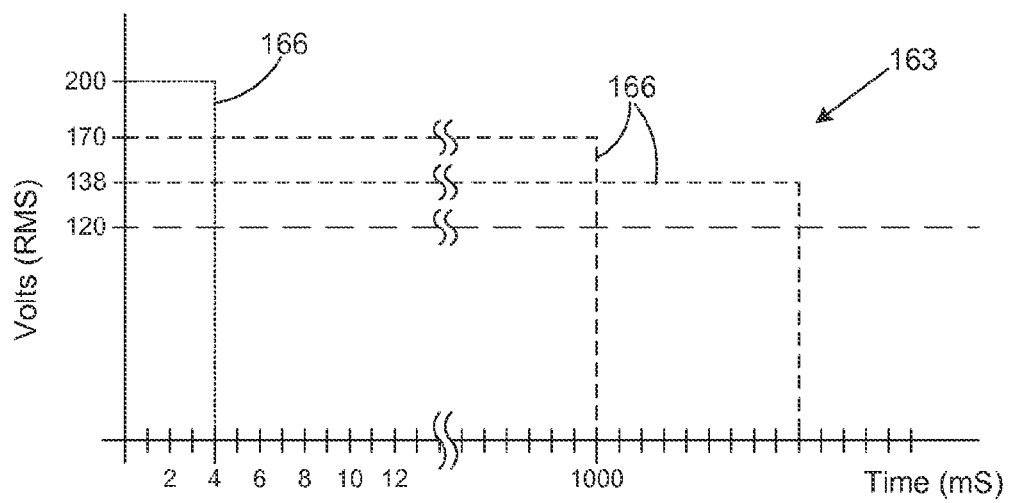
FIG. 2 is a graph depicting examples of voltage-time curves employed in the operation of the voltage surge suppressors of FIG. 1 according to various embodiments of the present disclosure.

Referring next to FIG. 2, shown is a voltage-time chart 163 that depicts several voltage-time curves 166 that act as predefined voltage-time thresholds that are used by the processor circuit 143 to control the operation of the first and second switching elements R1 and R2 (FIG. 1), The data associated with the voltage-time curves 166 is stored in a memory associated with the processor circuit 143.

Each curve 166 represents a magnitude-duration threshold for an overvoltage in the power voltage V (FIG. 1) that is used to determine when the processor circuit 143 is to take action to prevent potential electrical damage to circuitry due to an overvoltage. This is to say, if a magnitude of an overvoltage lasts long enough, the amount of energy inherent in the overvoltage may cause damage to circuitry as will be discussed.

The voltage-time curves 166 act as magnitude-duration thresholds by which it may be determined that there is too much energy in an overvoltage to be handled by the first and second voltage clamping devices 109 and 113.

In this respect, for example, assume that the power voltage V applied to the voltage protector 100 (FIG. 1) has a nominal value of 120 volts RMS at 60 Hz. According to one embodiment, any overvoltage experienced by the power voltage V that is less than 15% over the nominal 120 volt RMS value is a "safe" value such that the voltage protector 100 continues to supply the power voltage V to the load 103 through the series inductance L. However, if the power voltage V is equal to or greater than the 115% of the nominal voltage for a predefined period of time, for example, then the voltage protector 100 may take action to protect the voltage clamping devices 109 and 113, and the electrical load 103 from the overvoltage. In this respect, the voltage clamping devices 109 and 113 may conduct current due to the overvoltage, but may become overheated or may experience other damage causing a fire hazard if the overvoltage moves beyond the specified voltage-time curves 166.

During operation of the voltage protector 100, the first and second voltage clamping devices 109 and 113 operate to dissipate voltage transients and overvoltages to protect the electrical load 103. Specifically, when a high voltage transient such as caused by a lightning strike is experienced in the power voltage V, it first encounters the first voltage clamping device 109 that begins to conduct. The series inductance slows down the propagation of the voltage transient or overvoltage to allow the first voltage clamping device 109 to clamp the voltage at its clamping level. The second voltage clamping device 113 then conducts any excess voltage to ground G that passes through the series inductance L According to one embodiment, since the clamping level (i.e. 300 volts) of the second voltage clamping device 113 is approximately one half the clamping level (i.e. 600 volts) of the first voltage clamping device 109, then the dissipation of the excess voltage experienced from a voltage transient or overvoltage is distributed between the first and second voltage clamping devices 109 and 113.

As mentioned above, the voltage clamping level of the first voltage clamping device 109 may comprise, for example, 600 volts, and the second voltage clamping device 113 may have a clamping level of 300 volts as can be appreciated. Alternatively, some other ratio of clamping voltages may exist between the first and second voltage clamping devices 109 and 113. The specific voltage clamping levels of the first and second voltage clamping devices 109 and 113 also depend upon the nominal value of the power voltage V. It should be noted that even though the clamping voltage of the first clamping device 109 is 600 volts, the electrical load 103 is never exposed to a voltage that is higher than the clamping voltage of the second clamping device 113 (i.e. 300 volts). Also, the first voltage clamping device 109 affords protection against voltage transients and the like even if the switching elements R1 and R2 are in an off state.

The processor circuit 143 is configured to control the first and second switching elements R1 and R2 to selectively establish a direct coupling of the power voltage V to the electrical load 103. In this respect, when the power voltage V experiences an overvoltage that extends beyond one or more of the voltage-time curves 166, the processor circuit is configured to manipulate the switching elements R1 and R2 in order to at least partially isolate the electrical load 103 and the second voltage clamping device 113 from the power voltage V until the overvoltage has abated. In one embodiment, the electrical load 103 is entirely decoupled from the power voltage V where the switching elements R1 and R2 are in the off state as will be described.

In this respect, the second voltage clamping device 113 with a lower conduction voltage dissipates the bulk of the energy in the case of sustained overvoltage from incoming line to neutral N. Where the dissipation due to the overvoltage is so great that the first or second voltage clamping device 109 or 113 may overheat or burn up, the thermal fuse 106 will blow, thereby protecting all of the circuitry in the voltage protector 100. Other implementations for protecting the voltage clamping devices with thermal fuses are well known and will not be discussed in greater detail herein.

Thus, the voltage protector 100 advantageously ensures that the electrical load 103 is protected from voltage transients and overvoltages without presenting a fire hazard. Where the voltage clamping devices 109 and 113 comprise metal oxide varistors, they may only last 8 to 10 milliseconds under typically encountered overvoltage conditions while dissipating significant energy before overheating or damage results, To this end, the design of the voltage protectors as described herein take into account the limited capabilities of such voltage clamping devices.

Typical transient voltage surge suppressors do not take such limitations into account. For example, even in the rare case where over-voltage protection is claimed, metal oxide varistors used may be subject to over-voltages for as much as 100-200 milliseconds, which is enough to permanently damage the metal oxide varistors.

Note that the voltage-time curves 166 are specified so as to prevent the processor circuit from implementing nuisance switching of the switching elements 109 and 113 to isolate the electrical load 103 during overvoltages that may not be high enough to cause damage. In this respect, some degree of overvoltage is tolerated in order to prevent unwarranted disruption of the operation of the electrical load 103. Such overvoltages are those that do not result in the overheating of the first and second voltage clamping devices 109 and 113, or cause damage to the electrical load 103.

Figure 3:
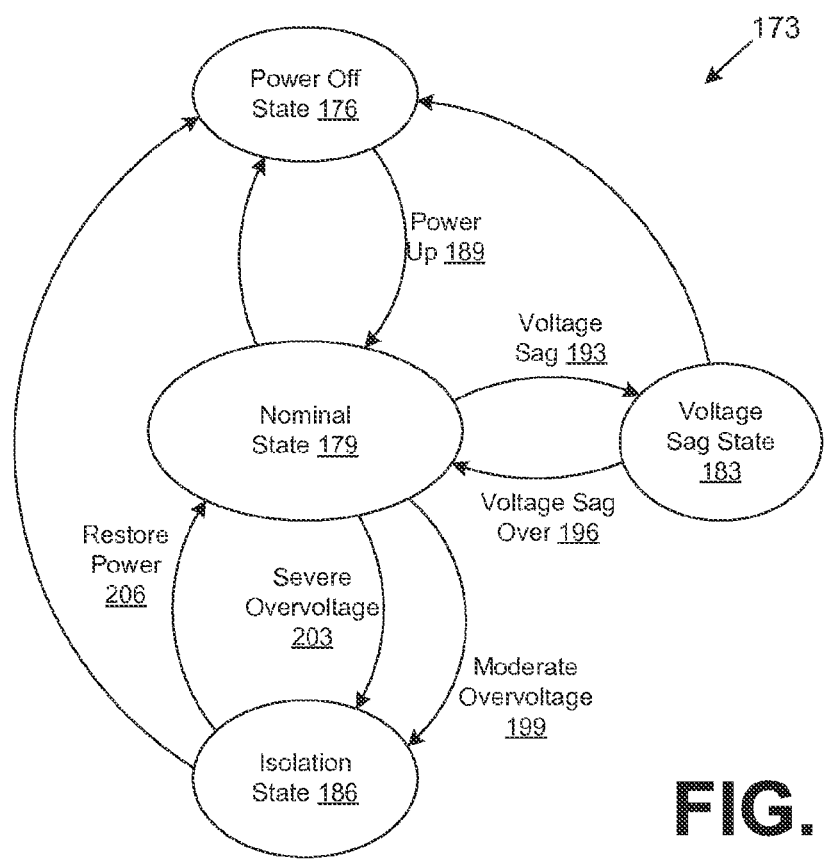
FIG. 3 is a state diagram that provides one example of the operation of the voltage surge suppressor of FIG. 1 according to various embodiments of the present disclosure.

In view of the foregoing, the operation of the voltage protector 100 is discussed with greater particularity with reference to the figures that follow, With reference to FIG. 3, shown is a state diagram 173 that depicts the operation of logic executed within the processor circuit 143 according to an embodiment. Alternatively, the state diagram 173 of FIG. 3 may be viewed as depicting steps of a method implemented in the processor circuit 143.

The state diagram 173 includes a "power off" state 176, a "nominal" state 179, a "voltage sag" state 183, and an "isolation" state 186. The "power off" state 176 is the state of the processor circuit 143 when there is no power is applied to the inputs of the processor circuit 143. Assuming that power is applied to the voltage protector 100, then a power up routine 189 is implemented to transition the state of the processor circuit 143 from the power off state 176 to the nominal state 179. The nominal state 179 represents a normal operating state of the processor circuit 143 such that the power voltage V is nominal and no voltage anomalies such as transients or overvoltages are experienced as described above. If power is lost while the processor circuit 143 is in the nominal stare 179, the voltage sag state 183, or the isolation state 186, then the processor circuit 143 reverts to the power off state 176.

If, while in the nominal state 179, a voltage sag occurs in the power voltage V, then a "voltage sag" routine 193 is implemented so as to transition the operation of the processor circuit 143 to the voltage sag state 183. In the voltage sag state, the processor circuit 143 waits until a voltage sag has come to an end in order to transition back to the nominal state 179. In transitioning back to the nominal state, the processor circuit 143 will implement a "voltage sag over" routine 196.

In addition, if while in the nominal state 179, the voltage protector 100 experiences an overvoltage, the processor circuit 143 will decide whether it is necessary to enter the isolation state 186 depending upon whether the overvoltage exceeds a given one of the voltage-time curves 166 as described above. In some cases, overvoltages may comprise moderate overvoltages that may not provide immediate harm to the electrical load 103. However, if the duration of such moderate overvoltages lasts beyond the time specified by a given one of the voltage-time curves 166, then such moderate overvoltage may become damaging due to the excess energy involved. In such case, the processor circuit 143 transitions to the isolation state 186 by implementing a "moderate overvoltage" routine 199. However, if a severe overvoltage occurs such that imminent damage to the electrical load 103 and the voltage clamping devices 109 and 113 may occur, then the processor circuit 143 will transition from the nominal state 179 to the isolation state 186 by implementing a "severe overvoltage" routine 203.

When in the isolation state 186, a direct coupling between the input power voltage V and the load 103 is disconnected such that the electrical load 103 is at least partially isolated from the power voltage V during the duration of the potentially damaging overvoltage. When the moderate or severe overvoltage is over and the power voltage V has returned to nominal while in the isolation state 186, then the processor circuit 143 returns to the nominal state 179 by implementing a "restore power" routine 206. Examples of the various routines described above in transitioning between the respective operational states will be provided in the discussion that follows. It is understood that each flow chart depicted may be viewed as depicting the operation of the processor circuit 143, or such flow charts may be viewed as depicting steps of methods implemented in the voltage protector 100. In one embodiment, the flow charts depict functionality that may be implemented with any one of a number of programming languages associated with processor circuits that may be employed.

Figure 4:
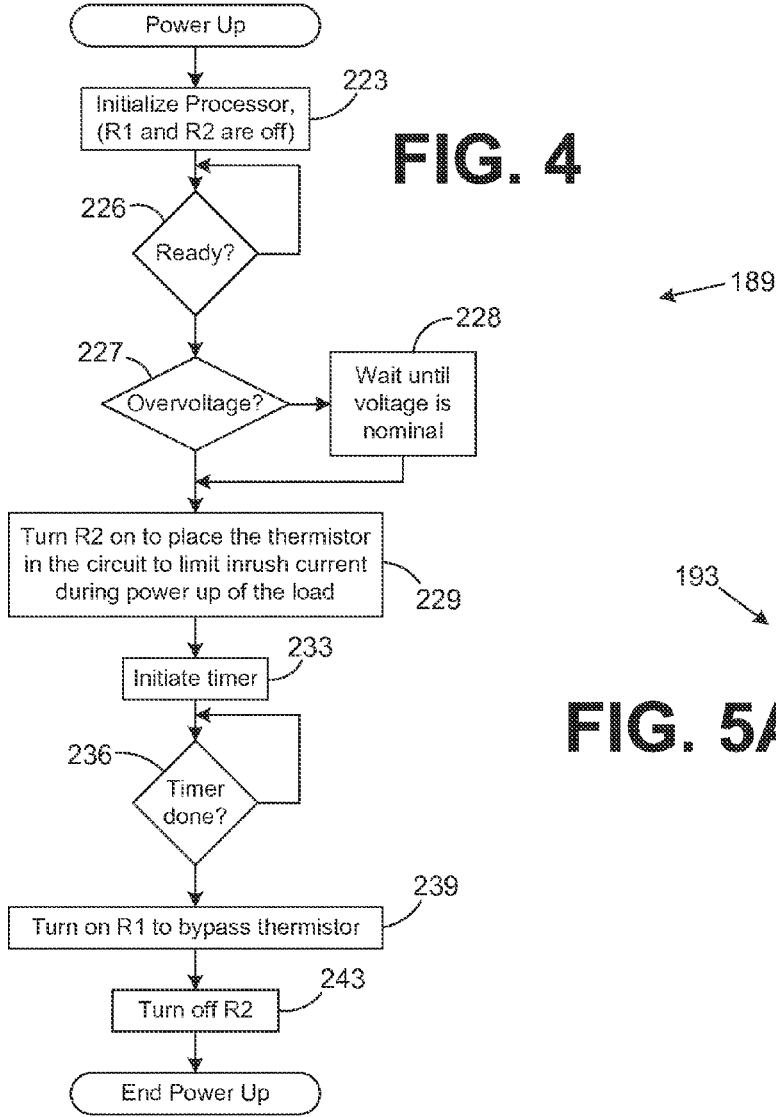
FIG. 4 is a flow chart illustrating one example of a power up routine of the voltage surge suppressor of FIG. 1 according to various embodiments of the present disclosure.

Referring next to FIG. 4, shown is one example of the power up routine 189 that occurs upon initial power up of the processor circuit 143 when the voltage protector 100 is first placed into an operational state with respect to an electrical load 103 as can be appreciated. Once the power voltage V is first applied to the input terminals of the voltage protector 100, in box 223, the processor circuit 143 is initialized as can be appreciated. In this initial state, the relays R1 and R2 are in the off positions (the first state) such that R1 couples the load through the resistor $R_S$ to neutral N and R2 presents an open circuit.

By virtue of the fact that the switching elements R1 and R2 are off when power is first applied, the electrical load 103 is isolated from the power voltage V. This is advantageous due to the fact that the power voltage V may be experiencing an overvoltage while the processor circuit 143 is first initializing. Specifically, because the processor circuit 143 is initializing when first powered up, it is not in a position to operate the switching elements R1 and R2 in order to adequately protect the electrical load 103. Accordingly, the switching elements R1 and R2 are specified to be in an off state upon the startup of the voltage protector 100 so as to protect the electrical load 103 during the initialization phase.

Next, in box 226, the initialization process proceeds until it has completed. Assuming that the processor circuit 143 is initialized, then box 227 the processor circuit 143 determines whether the power voltage V is currently experiencing an overvoltage such as a moderate or severe overvoltage. If no overvoltage is currently being experienced, then the processor circuit 143 proceeds to box 229. On the other hand, if an overvoltage exists, then the processor circuit 143 proceeds to box 228 in which the processor circuit 143 rats until the voltage has returned to nominal. Thereafter, the processor circuit 143 proceeds to box 229 as shown.

In box 229 the processor circuit 143 causes the switching element R2 to turn on in order to place the thermistor 126 into the circuit to limit an inrush current into the electrical load 103 during the initial power up of the load 103. In box 233, the processor circuit 143 initiates a tinier. This timer effectively determines a period of time for the electrical load 103 to fully power up with the thermistor 126 in the circuit, thereby ensuring that there will be no damaging inrush current to the electrical load 103.

In box 236, the processor circuit 143 determines whether the timer has reached a predefined time within which any potential inrush current into the electrical load 103 will have been abated. Assuming that the timer has reached the predefined time in box 236, then in box 239, the processor circuit 143 turns on switching element R1, thereby directly coupling the power voltage V to the electrical load 103 and bypassing the thermistor 126. In this respect, the thermistor 126 is bypassed as the direct coupling presented through the switching element R1 provides the path of least resistance to the electrical load 103.

Then, in box 243, the switching element R2 is turned off, thereby opening the circuit. Note that due to the fact that the switching element R2 is closed when switching element R1 was turned on, the voltage seen across switching element R1 at such time will be the voltage across the thermistor 126. This voltage is relatively low given that the thermistor 126 is added in series with the load 103. Where the switching element R1 is a relay, this fact advantageously prevents a significant voltage from developing over the contacts of a relay R1, thereby preventing significant sparking during the switching of the relay R1. Such sparking might otherwise result in damage to the relay over time that will significantly degrade its performance and lifespan. Thereafter, the processor circuit 143 enters nominal state 179.

Figure 5A:
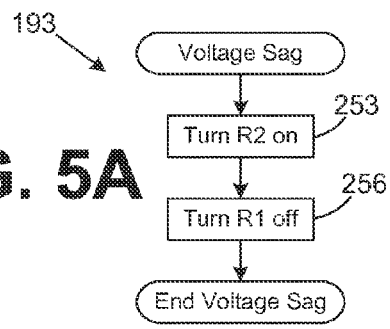
FIGS. 5A and 5B are flow charts illustrating one example of a response of the voltage surge suppressor of FIG. 1 to a voltage sag according to various embodiments of the present disclosure.

With reference to FIG. 5A, shown is one example of the voltage sag routine 193 that is implemented in order to transition from the nominal state 179 to the voltage sag state 183. The voltage sag routine 193 is implemented when the processor circuit 143 detects a voltage sag in the power voltage V as described above. The actually magnitude and duration of a voltage sag that causes the implementation of the voltage sag routine 193 can be predetermined. In one embodiment, the magnitude and duration of such a voltage sag may be specified such that voltage sags that are more severe than the predetermined threshold would result in a significant inrush current into the electrical load 103 when the power voltage V returns to nominal. However, the threshold voltage sag should be defined so as to prevent nuisance switching, etc. In one embodiment, a voltage sag of less than 75% nominal voltage for more than 2 to 3 cycles might result in significant current inrush. In another example, a voltage sage of 85% nominal voltage or higher for a few cycles would be ignored as a potential nuisance switching event.

The voltage sag routine 193 begins with box 253 in which the switching element R2 is turned on, thereby inserting the thermistor 126 into the circuit. At some point after R2 is turned on, in box 256, the switching element R1 is turned off. This causes the power voltage to be supplied to the electrical load 123 through the thermistor 126. Assuming that the switching element R1 is a relay, then by turning the switching element R2 on before turning the switching element R1 off, the voltage across the contacts of the relay R1 is equal to the voltage across the thermistor 126, thereby minimizing sparking across the contacts of the relay that can degrade the performance and lifespan of the relay as described above.

Thereafter, the voltage sag routine 193 ends and the processor circuit 143 is placed in the voltage sag state 183 in which the processor circuits waits until the voltage sag ends and the power voltage V returns to nominal. The level of voltage of the power voltage that qualifies as the voltage sag that would cause the implementation of the voltage sag routine 193 may be predetermined as can be appreciated.

Figure 5B:
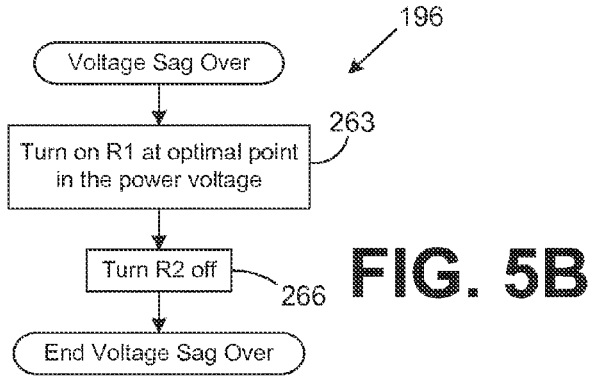

With reference then to FIG. 5B, shown is one example of the "voltage sag over" routine 196 that is employed when transitioning from the voltage sag state 183 back to the nominal state 179. The voltage sag over routine 196 is implemented when the processor circuit 143 detects that the power voltage V has returned to a nominal state based upon inputs from the voltage detect interface circuit 149 (FIG. 1).

When in the voltage sag state 183, the switching element R2 is in an off state, where power is supplied to the electrical load 103 through the thermistor 126. Also, the switching element R1 is in an off position such that the electrical load 103 is in parallel with the shunt resistance $R_S$.

To begin, in box 263, the voltage sag over routine 196 turns on R1 at an optimal point in the power voltage cycle. The optimal point in the power cycle is one that minimizes the creation of an inrush current in the electrical load 103. In particular, reference is made to the discussion of FIGS. 14-20 that mention the timing at which a thyristor or relay is controlled to establish the application of power voltage to the electrical load 103 while minimizing an inrush current to the electrical load 103. Once the switching element R1 is turned on at the optimal point in box 263, then the switching element R2 is turned off to allow the steady state operation of the load 103.

Referring next to FIG. 6, shown is a flowchart that provides one example of the moderate overvoltage routine 199 that is executed, for example, to transition the operation of the processor circuit 143 from the nominal state 179 to the isolation state 186 according to various embodiments. To begin, a moderate overvoltage 199 is detected when an overvoltage experienced in the power voltage V is such that it is greater than the minimum voltage-time curve 166, but is less than a voltage-time curve 166 that would deem to be immediately damaging to the electrical load 103 (i.e. a severe overvoltage). As such, moderate overvoltages may exist according for a predefined period of time before they are considered damaging. When the moderate overvoltage reaches the point where it may be potentially damaging, action may be taken to protect the various components of the voltage protector 100 and the electrical load 103 in a manner that minimizes potential damage to switching elements R1 as be described.

Beginning with box 273, the moderate overvoltage routine 199 initiates a timer 273. This timer is initiated in order to measure the duration of the overvoltage so that it can be compared with a given voltage-time curve 166 stored in the memory associated with the processor circuit 143. In box 273, it is determined whether to decouple the electrical load 103 from the power voltage V based upon whether the moderate overvoltage is greater than one of the given voltage-time curves 166 stored in the memory of the processor circuit 143.

Assuming that the electrical load 103 is to be decoupled from the power voltage V, then in box 279, the relay R2 is turned on, thereby injecting the thermistor 126 in series with the electrical load 103. Thereafter, in box 283, a delay is imposed upon the operation of the moderate overvoltage routine 199. Then, in box 286, the switching element R1 is switched off, thereby coupling the shunt resistance $R_S$ across faced neutral in parallel with the electrical load 103.

In this situation, the power voltage Vis applied to the electrical load 103 through the thermistor 126. This is advantageous as the voltage across the thermistor 126 is a relatively low voltage, which means that the voltage across the switching element R1 is equal to such voltage since the switching element R1 is in parallel with the switching element R2 and the thermistor 126. If the switching element R1 comprises a relay, then this lower voltage will minimize any sparking experienced at the contacts of the relay when turned off, thereby preventing major damage to the relay as described above.

In box 289, a further delay is imposed upon the implementation of the moderate overvoltage routine 199. Then in box 291, the switching element R2 is turned off, thereby completely decoupling the electrical load 103 from the power voltage V. Thereafter, the voltage protector 100 enters the isolation state 186 in which the electrical load 103 is isolated from the power voltage V until the overvoltage has ended and the power voltage V has returned to nominal. This action prevents the electrical load 103 from experiencing a potentially damaging overvoltage. Also, the first and second voltage clamping devices 109 and 113 are prevented from overheating and/or causing a fire, etc. At the same time, where the switching element R1 is a relay, the lifespan of the relay is extended.

Referring next to FIG. 7, shown is a flowchart that provides one example of the operation of the severe overvoltage routine 203 according to various embodiments. The severe overvoltage routine 203 transitions the processor circuit 143 from the nominal state 179 to the isolation state 186 in response to a severe overvoltage experienced in the power voltage V. A severe overvoltage is considered to be an overvoltage that is so high that immediate damage is threatened to the electrical load 103 and/or the first and second voltage clamping devices 109 and 113. In this respect, a severe overvoltage may result in physical damage to the second voltage clamping device 113 that may render it inoperative and potentially cause a fire or other malfunction.

A severe overvoltage may be defined by a predefined voltage-time curve 166 stored in a memory associated with the processor circuit 143. Beginning with box 293, the severe overvoltage routine 203 starts a timer. Then in box 296, the severe overvoltage routine 203 determines whether a severe overvoltage has occurred for a required predefined period of time, thereby necessitating isolation of the electrical load 103 from the power voltage V in an attempt to prevent destruction of the second voltage clamping device 113, and to protect the electrical load 103. Assuming that the duration of the severe overvoltage has reached the prescribed time specified in a respective voltage-time curve 166 associated with a severe overvoltage, then in box 299, the switching element R1 is turned off.

It may be the case where the switching element R1 comprises a relay that a significant spark may occur across the contacts of the relay R1 when it is turned off in this context since the switching element R2 is turned off at the same time. However, due to the potential damaging nature of the severe overvoltage, the damage that potentially may occur to the relay in this context is tolerated, even if such damage might result in undue degradation of the relay R1 and shorten its lifespan. However, given that the occurrences of such severe overvoltages are relatively rare, the potential damage in this context is tolerated rather than allowing the first and second voltage clamping devices 109 and 113 to be overheated or cause a fire, as well as to prevent damage to the electrical load 103. Thereafter, the processor circuit 143 enters the isolation state 196 in which the electrical load 103 is isolated from the power voltage V.

The restore power routine 206 is implemented to transition the processor circuit 143 from the isolation state 196 back to the nominal state 179 after the power voltage V has returned to nominal, having experienced either a severe or moderate overvoltage. In the isolation state 186, both the switching elements R1 and R2 are off. In order to transition the processor circuit 143 back to the nominal state 179, the switching element R1 is turned on at an optimal point in the power voltage in much as the way described above with respect to box 263 (FIG. 5B) so as to minimize an inrush current experienced by the electrical load 103. Consequently, the description of the restore power routine 206 is not provided herein in detail.

Figure 8:
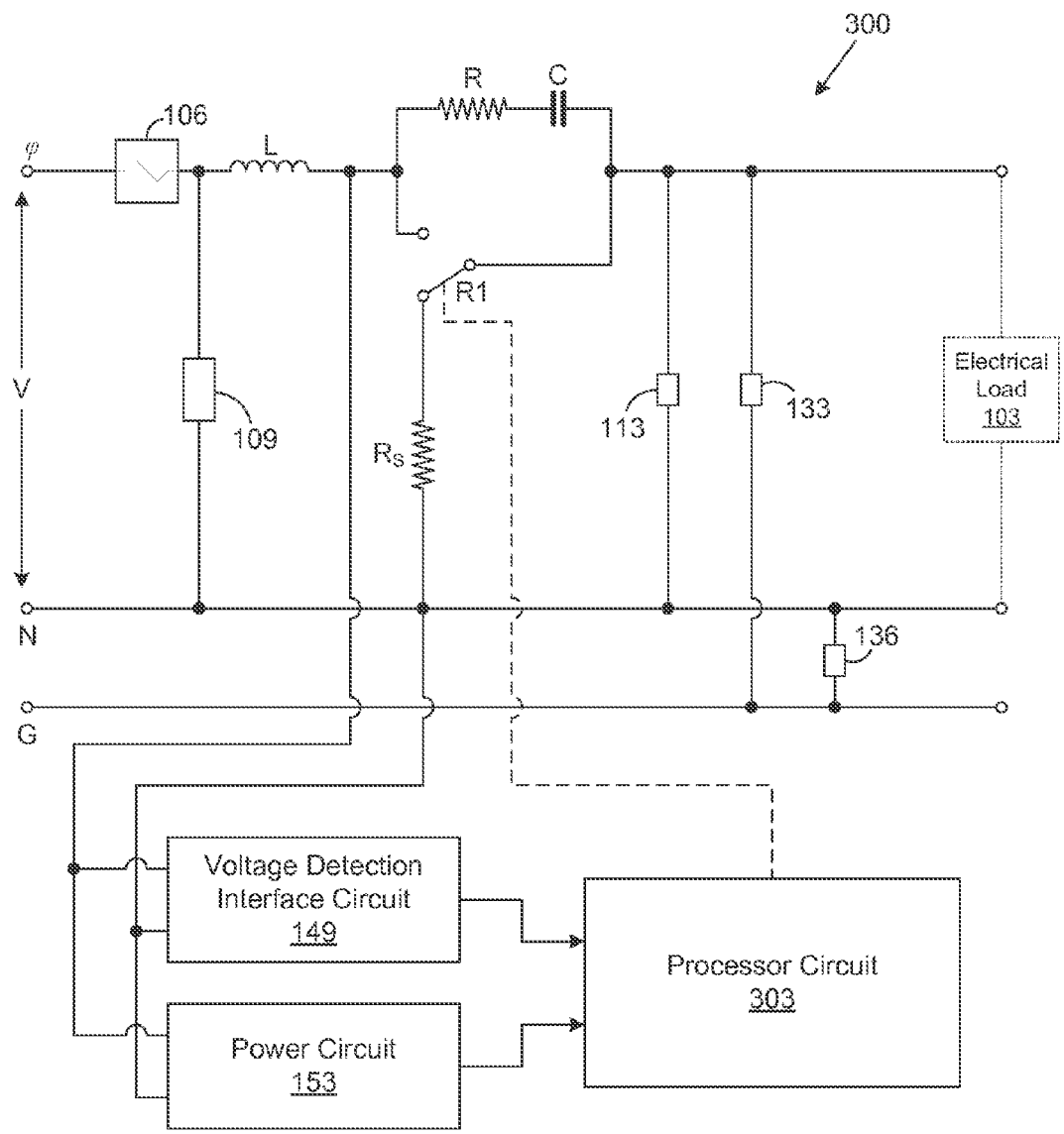
FIG. 8 is a schematic of another example of a second transient voltage surge suppressor according to various embodiments of the present disclosure.

Referring next to FIG. 8, shown is a schematic of a voltage protector 300 according to another embodiment of the present disclosure. The voltage protector 300 is similar to the voltage protector 100 with the exception that the voltage protector 300 does not include the current surge detection interface circuit 146 (FIG. 1), the switching element R2 (FIG. 1), and the thermistor 126 (FIG. 1). Also, the voltage protector 300 includes a processor circuit 303 that executes logic that differs from that executed in the processor circuit 143 (FIG. 1). Rather, the voltage protector 300 includes an R-C snubber comprising a resistance R and a capacitance C in parallel with the switching element R1 as shown. The R-C snubber comprises a very large impedance that provides a significant degree of isolation between the power voltage V and the electrical load 103 when the switching element R1 is off, thereby coupling the shunt resistance $R_S$ from phase φ to neutral N.

The operation of the voltage protector 300 is similar to the operation of the voltage protector 100 described above with the exception that the switching element R2 is eliminated. In this respect, the power circuit 143 controls the operation of the switching element R1 in response to overvoltages and voltage sags experienced in the power voltage V. In particular, when the switching element R1 is on, the power voltage V is applied directly to the electrical load 103, where the direct connection through the switching element R1 presents the path of least resistance bypassing the R-C snubber. Thus, the switching element R1 is employed to selectively establish a direct coupling of the power voltage V to the electrical load 103. An overvoltage is effectively dissipated using the first and second voltage clamping devices 109 and 113 as described above with respect to the voltage protector 100.

However, when the energy associated with an overvoltage either due to the high magnitude of the overvoltage or the long duration of the overvoltage reaches a point where the first and second voltage clamping devices 109 and 113 may be damaged, or where the electrical load 103 may experience damage as described above, then the processor circuit 143 will turn the switching element R1 off, thereby injecting the R-C snubber in series between the power voltage V and the electrical load 103. Also, the shunt resistance $R_S$ is injected in parallel with the electrical load 103 to prevent high stray voltage from being impressed across the electrical load 103.

The processor circuit 143 is configured to turn off the switching element R1 upon the occurrence of an overvoltage as described above, or upon the occurrence of a voltage sag. When the power voltage V returns to nominal at the end of an overvoltage, the switching element R1 is turned on to resume normal operation. When the power voltage has returned to nominal after a voltage sag, the switching element R1 is turned on at the optimal time during the cycle of the power voltage so as to minimize an inrush current to the electrical load 103 in a similar manner as was described with reference to FIG. 5b above.

Figure 9:
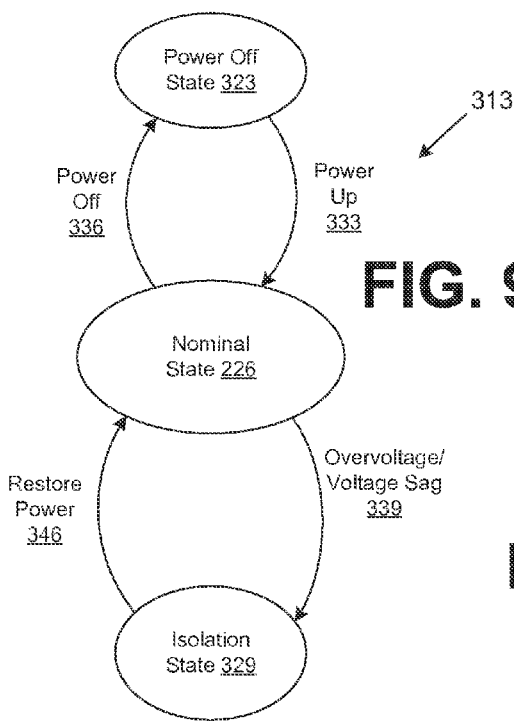
FIG. 9 is a state diagram that provides one example of the operation of the transient voltage surge suppressor of FIG. 8 according to various embodiments of the present disclosure.

In view of the foregoing, the operation of the voltage protector 300 is discussed with greater particularity with reference to the figures that follow, With reference to FIG. 9, shown is a state diagram that illustrates the control logic 313 implemented in the processor circuit 303 (FIG. 8) according to an embodiment of the present disclosure. Alternatively, the state diagram of FIG. 9 may be viewed as depicting steps of a method implemented in the processor circuit 303. The control logic 313 includes a power off state 323, a nominal state 326, and an isolation state 329. The power off state 323 represents the state of the processor circuit 303 when no power voltage V is applied to the voltage protector 300 and the voltage protector 300 is in an off condition. When the power voltage V is applied to the inputs of the voltage protector 300, then the voltage protector 300 transitions to the nominal state 326 by implementing the power up routine 333. Also, when the voltage protector 300 reverts to the power off state 323 upon experiencing a loss of power 336.

While in the nominal state 326, the voltage protector 300 applies the power voltage V directly to the electrical load 103 through the inductance L as shown. When voltage transients or overvoltages are experienced in the power voltage V, the first and second voltage clamping devices 109 and 113 conduct the excess voltage from phase φ to neutral N and limit the ability of such voltage transients or overvoltages from reaching the electrical load 103. The dissipation of the voltage transients and overvoltages are distributed among the first and second voltage clamping devices 109 and 113 as was described above with respect to the voltage protector 100. The value of the inductance L is chosen to control how much current flows through the first voltage clamping device 109, and how the energy dissipation is distributed between the first and second voltage clamping devices 109 and 113.

In this respect, the inductance L slows down the speed of voltage transients and overvoltages to provide time for the first voltage clamping device 109 to dissipate at least part of the excess voltage to neutral N before the second voltage clamping device 113 begins to dissipate any remaining excess voltage to neutral N. When the isolation state 329, the switching element R1 is in the off position and the first voltage clamping device 109 dissipates the excess voltage during the duration of the overvoltage or surge. As a result, the second voltage clamping device 113 does not see sustained exposure to the high voltage level across the first voltage clamping device 109.

The voltage clamping level of the first voltage clamping device 109 may comprise, for example, 600 volts, and the second voltage clamping device 113 may have a clamping level of 300 volts as can be appreciated. Alternatively, some other ratio of clamping voltages may exist between the first and second voltage clamping devices 109 and 113. The specific voltage clamping levels of the first and second voltage clamping devices 109 and 113 may depend upon the nominal value of the power voltage V.

By virtue of the fact that the second voltage clamping device 103 is isolated from the power voltage when the switching element R1 is in the off position, the second voltage clamping device 113 is not exposed to the high voltage surge that is handled by the first voltage clamping device 109. This prevents overheating and a potential fire hazard under overvoltage conditions.

Upon detecting an overvoltage or a voltage sag in the nominal state 326, then the control logic 313 implements the overvoltage/voltage sag routine 339 in which the switching element R1 is turned off to transition the operation of the processor circuit 303 to the isolation state 329. When the overvoltage or voltage sag condition has abated, the control logic 313 implements the restore power routine 343 to return the operation of the processor circuit 303 to the nominal state 326.

Figure 10:
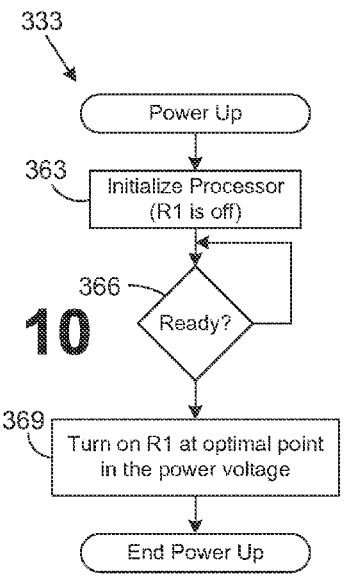
FIG. 10 is a flow chart illustrating one example of a power up routine of the transient voltage surge suppressor of FIG. 8 according to various embodiments of the present disclosure.

With reference to FIG. 10, shown is a flowchart that provides one example of the power up routine 333 according to one embodiment. When power voltage V is initially applied to the voltage protector 300, the switching element R1 is in the off position, thereby coupling the shunt resistance $R_S$ in parallel with the electrical load 103 and injecting the resistance R and capacitance C in series with the inductance L between the power voltage and the electrical load 103. This protects the electrical load 103 from voltage transients and overvoltages until the operation of the processor circuit 303 of the voltage protector 300 is initialized.

Starting with box 363, the processor circuit 303 is initialized while the switching element R1 remains in an off position. When the processor circuit 303 is initialized as determined in box 366, the power up routine 333 proceeds to box 369. In box 369, the switching element R1 is turned on at an optimal point in the cycle of the power voltage V that minimizes an inrush current to the electrical load 103 in a similar manner as was described above with reference to box 363 (FIG. 5B). Thereafter, the power up routine 333 ends and the control logic 313 enters the nominal state 326.

Figure 11:
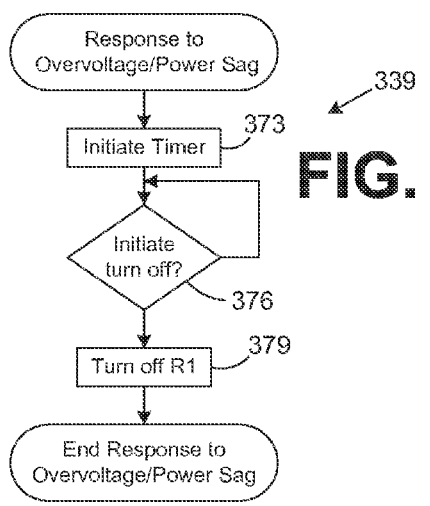
FIG. 11 is a flow chart that illustrates one example of a response of the transient voltage surge suppressor of FIG. 8 to an overvoltage or voltage sag according to various embodiments of the present disclosure.

Referring next to FIG. 11, shown is one example of a flowchart that provides one illustration of the "overvoltage/power sag" routine 339 that transitions the control logic 313 from the nominal state 326 to the isolation state 329 according to various embodiments. At the time the overvoltage/voltage sag routine 339 is implemented, the switching element R1 is in the on state and the power voltage V is directly applied to the electrical load 103, thereby bypassing the R-C snubber as described above.

To begin, once an overvoltage or a power sag is detected, then in box 373 a timer is initiated to determine the duration of the overvoltage or power sag to determine whether to turn the switching element R1 off. The duration and magnitude of the overvoltage may be compared with the voltage-time curves 166 maintained in a memory of the processor circuit 303 to determine whether the switching element R1 should be turned off to protect the electrical load 103 and the second voltage clamping device 113. Alternatively, if a power sag is detected, then the duration and magnitude of the sag voltage may be compared against thresholds stored in the memory to determine whether intervention is necessary to minimize or reduce harmful in-rush current when the power voltage V returns to nominal.

If the overvoltage is greater than a respective voltage-time curve 166 threshold, or if a voltage sag is deemed severe enough as to result in a potentially harmful in-rush current to the electrical load 103, then in box 379 the switching element R1 is turned off, thereby placing the impedance of the RC snubber in series with the electrical load 103. Also, the shunt resistance $R_S$ is placed in parallel with the electrical load 103. In this circumstance, the voltage protector 300 is in the isolation state 329 where the electrical load 103 is protected and the second voltage clamping device 113 will not overheat.

Figure 12:
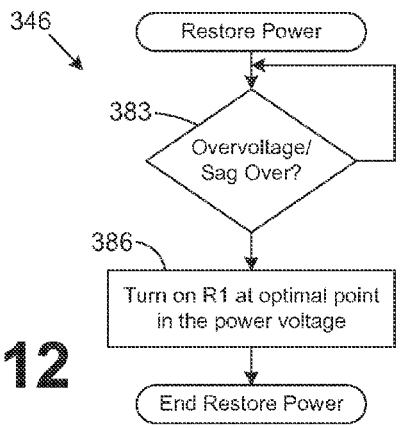
FIG. 12 is a flow chart that illustrates one example of a routine that restores the transient voltage surge suppressor of FIG. 8 to a nominal state after an overvoltage or voltage sag in the power voltage has ended according to various embodiments of the present disclosure.

Referring next to FIG. 12 shown is one example of a flowchart that provides one illustration of the "restore power" routine 346 that transitions the control logic 313 from the isolation state 329 to the nominal state 326 according to various embodiments, in box 383, it is determined whether the power voltage V (FIG. 8) has returned to nominal. If so, then in box 386, the switching element R1 is turned on at an optimal point in the cycle of the power voltage V that minimizes a potential inrush current to the electrical load 103 in a similar manner as was described above with reference to box 363 (FIG. 5B). Note that in the case of an overvoltage, step 386 may be unnecessary unless the voltage to the electrical load 103 drops significantly due to the voltage lost across the RC snubber. Thereafter, the restore power routine 343 ends and the control logic 313 is placed in the nominal state 326.

Figure 13:
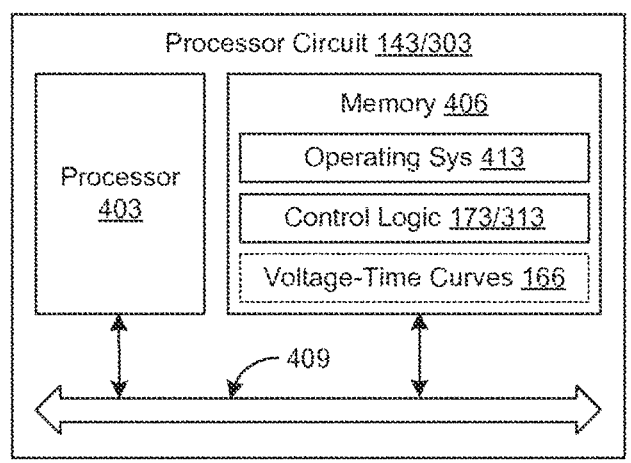
FIG. 13 is a schematic block diagram of a processor circuit employed in the voltage surge suppressors of FIG. 1 or 8 according to various embodiments of the present disclosure.

Referring next to FIG. 13, shown is one example of the processor circuit 143 or 303 according to embodiments of the present disclosure. The processor circuit 143/303 comprises, for example, a processor 403 and a memory 406, both of which are coupled to a local interface 409. To this end, the local interface 409 may comprise, for example, a data bus with an accompanying address/control bus as can be appreciated.

Stored on the memory 406 and executable by the processor 403 are an operating system 413 and the control logic 173/313. Also, data representing one or more voltage-time curves 166 may be stored in the memory 406 or otherwise may be accessible to the processor circuit 143/303.

The memory 406 is defined herein as both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 403 may represent multiple processors and the memory 406 may represent multiple memories that operate in parallel. In such a case, the local interface 409 may be an appropriate network that facilitates communication between any two of the multiple processors, between any processor and any one of the memories, or between any two of the memories etc. The processor 403 may be of electrical or of some other construction as can be appreciated by those with ordinary skill in the art.

The operating system 413 is executed to control the allocation and usage of hardware resources such as the memory, processing time and peripheral devices in the processor circuit 143/303. In this manner, the operating system 413 serves as the foundation on which applications depend as is generally known by those with ordinary skill in the art.

Although the control logic 173 and/or 313 are each embodied in software or code executed by general purpose hardware as discussed above, as an alternative the same may also be embodied in dedicated hardware or a combination of software/general purpose hardware and dedicated hardware. If embodied in dedicated hardware, the control logic 173 or 313 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The state diagrams and/or flow charts of FIGS. 3-7 and 9-12 the functionality and operation of an implementation of the control logic 173 and the control logic 313. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc, if embodied in hardware, each block may represent a circuit or a number of interconnected circuits to implement the specified logical function(s).

Although the state diagrams and/or flow charts of FIGS. 3-7 and 9-12 show a specific order of execution, it is understood that the order of execution may differ from that which is depicted. For example, the order of execution of two or more blocks may be scrambled relative to the order shown. Also, two or more blocks shown in succession in FIGS. 3-7 and 9-12 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. R is understood that all such variations are within the scope of the present invention.

Also, where the control logic 173 and/or the control logic 313 comprises software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the control logic 173 and/or the control logic 313 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

The following discussion of FIGS. 14-20 relate to determining the optimal point in the power cycle at which to establish the direct coupling of the power voltage V to the electrical load 103 so as to minimize an inrush current to the electrical load 103. In particular, the discussion of FIGS. 14-20 describe the control of a thyristor or relay in order to establish the application of power voltage to the electrical load 103 while minimizing an inrush current to the electrical load 103. Generally, the timing at which the thyristor or relay are manipulated to establish the direct coupling applies to the control of the switching element R1 as described above with reference to FIGS. 1 and 8.

Figure 14:
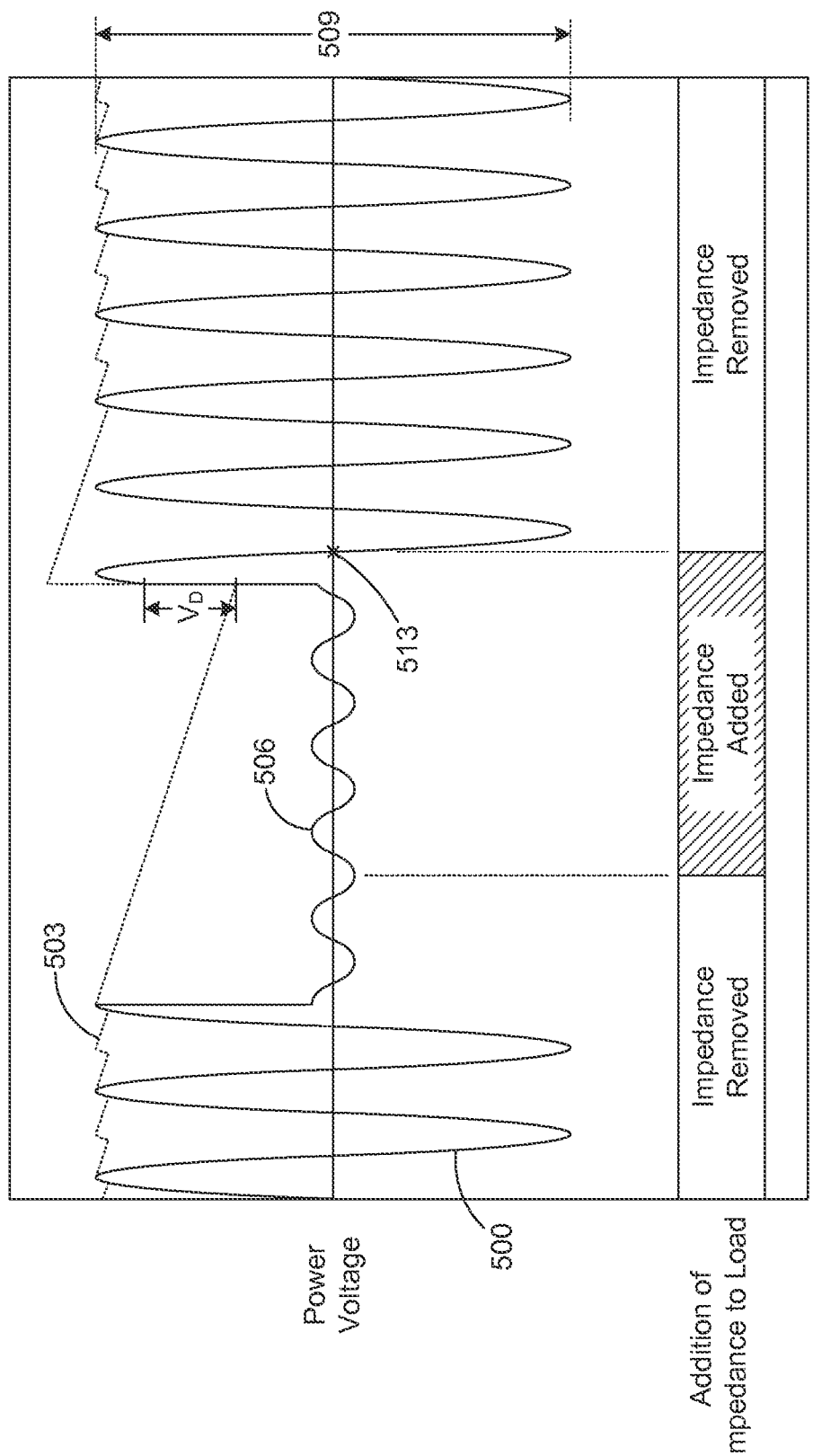
FIG. 14 depicts one example of a plot of a line voltage with respect to time that illustrates the timing relating to the insertion and removal of a current limiting impedance in association with the voltage sag according to an embodiment of the present disclosure.

With reference to FIG. 14, shown is a chart that plots a power voltage 500 with respect to time to illustrate the various embodiments of the present disclosure. The power voltage 500 is applied to a load that may comprise, for example, an inductive load, a rectifier load, a capacitive load, or other type of electrical load as can be appreciated. In the case that the power voltage 500 is applied to a rectifier load, then a voltage is generated across a capacitor associated with the rectifier as can be appreciated. In this respect, the capacitor facilitates the generation of a DC power source in conjunction with the function of the diodes of the rectifier.

With respect to FIG. 14, the capacitor voltage 503 is depicted as the DC voltage that exists across a capacitor associated with the rectifier. From time to time during the steady state operation of the load to which the power voltage 500 is applied, a voltage sag 506 may occur in the power voltage 500. During a voltage sag 506, the capacitor voltage 503 may steadily decrease as the capacitor itself is drained as it supplies current to the electrical load coupled to the rectifier. At the end of a voltage sag 506, it is often the case that the power voltage 500 suddenly returns to a nominal voltage 509. The nominal voltage 509 is the normal operating voltage of the power voltage 500.

Depending where in the power voltage cycle that the power voltage 500 returns to the nominal voltage 509, there may be a significant voltage differential $V_D$ between the power voltage 500 and the capacitor voltage 503. This voltage differential $V_D$ may ultimately result in a significant inrush current as the load resumes steady state operation. Where the load is a rectifier load, then the inrush current occurs due to the fact that the rectifier capacitor needs to be charged up and other components that make up the load may pull more current at the end of the voltage sag 506.

The magnitude of the inrush current is affected by various load factors such as, for example, the type of load, the condition of load, the proximity of the load with respect to the power voltage 500, power supply factors, the duration of the voltage sag 506, the line impedance, and the location of any transformer associated with the stepping the power voltage 500 up or down, and other factors. In addition, the magnitude of any inrush current after the occurrence of a voltage sag 506 will depend upon the magnitude of the voltage differential $V_D$ that exists at the instant that the power voltage 500 returns to the nominal voltage 509. The nominal voltage 509 is defined herein as a nominal value assigned to a circuit or system for the purpose of conveniently designating its voltage class or type. In this sense, nominal voltage may comprise a standardized voltage specified for various purposes such as power distribution on a power grid, i.e. 120/240 Delta, 480/277 Wye, 120/208 Wye or other specification. Alternatively, the nominal voltage may comprise a standardized voltage in a closed system such as, for example, a power system on a vehicle such as an airplane, etc. A nominal voltage may be, for example, an AC voltage specified in terms of peak to peak voltage, RMS voltage, and/or frequency. Also, a nominal voltage may be a DC voltage specified in terms of a voltage magnitude.

In order to limit the inrush current at the end of a voltage sag 506, according to various embodiments of the present disclosure, an impedance is added to the load upon detection of the voltage sag 506 in the power voltage 500 during the steady state operation of the load. In this respect, the power voltage 500 is monitored to detect a voltage sag 506 during the steady state operation of the load. Once an occurrence of a voltage sag 506 is detected, the impedance is added to the load. Thereafter, the impedance is removed when the power voltage 500 has reached a predefined point 513 in the power voltage cycle after the power voltage 500 has returned to the nominal voltage 509.

The timing of the removal of the impedance from the load after the power voltage 500 has returned to the nominal voltage 509 is specified to as to minimize an occurrence of an inrush current surge flowing to the load according to various embodiments of the present disclosure. In this respect, the removal of the impedance from the load is timed at the predefined point on the power voltage cycle of the power voltage 500.

In one embodiment, the impedance is removed from the load when the power voltage 500 is less than a magnitude of the capacitor voltage 503 across a capacitor associated with a rectifier, where the load is a rectifier load. In such a scenario, given that the line voltage 500 is rectified, then it can be said that the impedance is removed from the load when the absolute value of the magnitude of the power voltage 500 is less than a magnitude of the voltage 503 across the capacitor associated with the rectifier of the load.

At such time, the respective diodes in the rectifier are reversed biased when the absolute value of the magnitude of the power voltage 500 is less than the magnitude of the voltage 503 across the capacitor associated with the rectifier of he load. Consequently, there is no inrush current when the absolute value of the magnitude of the power voltage 500 is less than the magnitude of the voltage 503 across a capacitor associated with a rectifier of the load. Ultimately, in this scenario, the capacitor associated with the rectifier is charged when the normal peaks of the rectified power voltage 500 are applied to the capacitor, rather than experiencing an instantaneous change in the voltage as illustrated by the voltage differential $V_D$ depicted in FIG. 14.

In an additional alternative, the impedance is removed from the load at approximately a zero (0) crossing of the power voltage 500 that occurs after the power voltage has returned to the nominal voltage 509 after the end of a voltage sag 506. In this respect, to be "approximate" to the zero crossing, for example, is to be within an acceptable tolerance associated with the zero crossing such that the magnitude of the power voltage 500 is unlikely to be greater than a voltage 503 across a capacitor associated with a rectifier of the load.

In another embodiment, the impedance may be removed from the load at approximately a first one of the many zero crossings that occur after the power voltage 500 as returned to the nominal voltage 509. This is advantageous as the power is returned to the load as soon as possible but in a manner that minimizes the possibility that a significant inrush current will occur.

In yet another embodiment, the impedance may be removed from the load at a point on the power voltage cycle that substantially minimizes the differential $V_D$ between an absolute value of the magnitude of the power voltage 500 and a magnitude of the voltage 503 across a capacitor associated with a rectifier of the load. In this respect, if the power voltage 500 returns to the nominal voltage 509 at a location in the power voltage cycle such that the magnitude of the power voltage 500 is close to the voltage 503 across the capacitor so that minimal inrush current may result, then the impedance may be removed potentially even in a case where the power voltage 500 is on an upswing and is greater than the voltage 503 across the capacitor, as long as the voltage differential $V_D$ is small enough so as to result in an acceptable amount of inrush current to the load.

In such a case, a maximum voltage differential $V_D$ may be specified that results in a maximum allowable inrush current that could be applied to the load, where the impedance would not be removed if the actual voltage differential $V_D$ is greater than the maximum voltage differential $V_D$ specified. As depicted in the graph of FIG. 14, shown is an embodiment in which the impedance is added to the load during the voltage sag 506 and is removed at the point 513 in the power voltage cycle that occurs at a first zero crossing after the power voltage 500 returns to the nominal voltage 509 according to one embodiment of the present disclosure.

Figure 15:
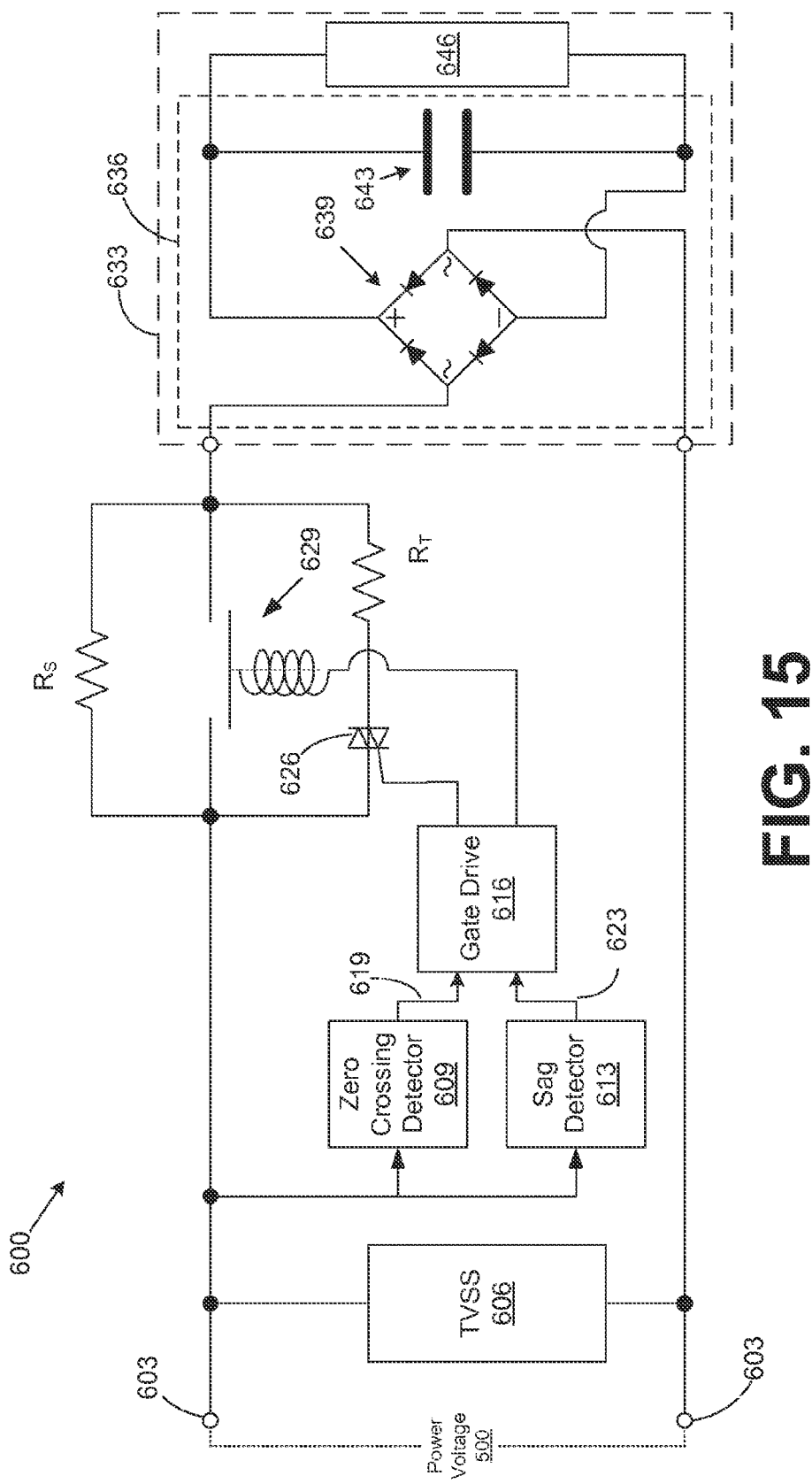
FIG. 15 is a schematic of one example of a current limiting circuit that operates to time the removal of a current limiting impedance as illustrated, for example, in FIG. 14 according to an embodiment of the present disclosure.

With reference next to FIG. 15, shown is a schematic of a current limiting circuit according to an embodiment of the present disclosure. The power voltage 500 (FIG. 14) is applied across input nodes 603 as shown. The power voltage 500 may be received from a typical outlet or other power source as can be appreciated. The current limiting circuit 600 includes a transient voltage surge suppressor 606 that is coupled across the input nodes 603. In addition, the current limiting circuit 600 includes a zero crossing detector 609, a sag detector 613, and a gate drive 616. The power voltage 500 is received as an input into both the zero crossing detector 609 and the sag detector 613. The output of the zero crossing detector 609 comprises a zero crossing signal 619 that is applied to the gate drive 616.

The output of the sag detector 613 is also applied to the gate drive 616. The gate drive 616 controls a thyristor 626 and a relay 629. In this respect, the gate drive 616 controls whether the thyristor 626 and the relay 629 are turned on or off. The relay 629 couples the input nodes 603 to a load 633. The thyristor 626 couples the input nodes 606 to the load 633 through a resister $R_T$. In the embodiment depicted in FIG. 15, the input nodes 603 are coupled to the load 633 through resistor $R_S$ that is in parallel with the relay 629 and the thyristor 626/resistor $R_T$ as shown.

The load 633 as depicted in FIG. 15 comprises a rectifier load having a rectifier 636. The rectifier 636 includes the diodes 639 and the rectifier capacitor 643. In addition, the load 633 may include other components 646 that receive DC power as can be appreciated. Alternatively, the load 633 may be an inductive load or other type of load. The zero crossing detector 609, the sag detector 613, and/or the gate drive 616 may be implemented with one or more micro processor circuits, digital logic circuitry, or analog circuitry as can be appreciated.

Next, a general discussion of the operation of the current limiting circuit 600 is provided according to one embodiment of the present disclosure. To begin, assume the power voltage 500 comprises a nominal voltage 509 is applied to the load and suddenly experiences a voltage sag 506 (FIG. 14). Assuming that the voltage sag 506 lasts a predefined threshold of time where the capacitor voltage 503 (FIG. 14) across the capacitor 643 drains appreciably, a risk is created of a significant inrush current when the power voltage 500 resumes the nominal voltage 509.

During steady state operation of the load, the relay 629 is in a closed position and the power voltage 500 is applied directly to the load 633 through the relay 629. Given that the relay 629 is a direct electrical connection, it presents the path of least resistance for the current flowing to the load 633. Consequently, the current bypasses the resistor $R_S$. During the steady state operation of the load, the thyristor 626 is also in an off state, thereby preventing current from flowing through the resistance $R_T$. Once the sag detector 613 detects the voltage sag 506, then the sag detector output 623 directs the gate drive 616 to open the relay 629. As a result, the voltage at the input nodes 623 is applied to the load 633 through the resistor $R_S$.

The resistance $R_S$ is obviously higher than the near zero resistance presented by the closed relay 629. By opening the relay 629, the resistor $R_S$ is added to the load 633. The resistance $R_S$ is specified so as to limit the current that can flow to the load 633. This resistance thus limits any current surge that might occur when the voltage returns to nominal and the voltage sag 506 has ended, thereby minimizing or eliminating the possibility of damage to electrical components of the load 633 such as diodes 639 in the rectifier 636 or other components.

It should be noted that the resistance $R_S$ may also reduce the voltage that is seen by the load 633 during the voltage sag 506 until either the thyristor 626 is closed (turned on) or the relay 629 is closed. In this respect, the resistance $R_S$ can exacerbate the reduced voltage experienced by the load 633 during the voltage sag 506. However, the reduced voltage due to the resistor $R_S$ will not be much worse than what can typically be experienced by the load 633 without the resistance $R_S$. This is especially true if the voltage sag 506 lasts for a short time. If the voltage sag 506 lasts for relatively long time such that the operation of the load is disrupted, chances are any reduction in voltage due to the resistance $R_S$ would not be of any consequence.

For maximum protection, the current flow through the resistor $R_S$ should be low, but as stated above, this might increase the possibility of momentary interference with the load operation. Thus, the value of the resistance $R_S$ is determined based upon a trade off between protection in a multi-load environment and the possibility of nuisance interference with the operation of the load 633. Experiments show that the resistance $R_S$ generally does not interfere with the load operation for voltage sags of short duration lasting less than five (5) cycles or so.

Once the relay 629 is opened due to the detection of the voltage sag 506, then the current limiting circuit 600 stays in such state until the sag detector 613 detects that the voltage sag 506 has ended. Assuming that the voltage sag 506 has ended, then the sag detector output 623 is appropriately altered. In response, the gate drive 616 does not dose the relay 629 right away. Rather, the relay 629 is maintained in an open state. The gate drive 616 waits until a signal is received from the zero crossing detector 609 indicating that a zero crossing has been reached in the power voltage cycle. The zero crossing output 619 applied to the gate drive 616 indicates the occurrence of all zero crossings.

Upon receiving an indication of a zero crossing after receiving an indication that the voltage sag 506 has ended, the gate drive 616 turns on the thyristor 626 to allow current to flow to the load 623 through the thyristor 626 and the resistance $R_T$. The resistance $R_T$ is specified to protect the thyristor 626. In particular, the resistance $R_T$ limits the worst case current that flows to the load 633 through the thyristor 626 to within the maximum current rating of the thyristor 626. Thus, the resistance $R_T$ is less than the resistance $R_S$ and effectively allows the nominal power voltage 500 to be applied to the load 633, The thyristor 626 is advantageously employed to cause the power voltage 500 to be reapplied to the load 633 after the end of the voltage sag 506 as the thyristor 626 is much faster in operation than the relay 629. In this respect, the thyristor 626 can be turned on, for example, within approximately 10 microseconds as opposed to the relay 629 that might take approximately five to ten milliseconds. Because of the speed at which the thyristor 626 can operate, the thyristor 626 allows the current limiting circuit 600 to control exactly where on the power voltage cycle that the power voltage 500 is reapplied to the load 633.

Alternatively, if the reaction time of the relay 629 in response to a change in the state of the output signal from the gate drive 616 is sufficiently fast or can be estimated with sufficient accuracy, then it may be the case that the relay 629 could be used without the thyristor 629. Specifically, the relay 629 could be triggered to close (or turned off in the case of a normally dosed relay) at a predefined period of time before a zero crossing is to occur with the anticipation that the relay 629 will actually dose on or near the zero crossing itself. This embodiment would thus eliminate the need for the thyristor 626 and the resistance $R_T$.

Once the thyristor 626 has been on for a necessary amount of time to ensure that the capacitor 643 associated with the rectifier 636 is charged enough to avoid significant inrush current, or that the load 633 is operational to the extent that it will not cause an undesirable inrush current, the gate drive 616 closes the relay 629 to reestablish the conductive pathway between the input nodes 603 and the load 633. Thereafter, the gate drive 616 turns the thyristor 626 off.

Thus, to recap, the thyristor 626 provides the function of supplying the power voltage 500 to the load 633 after the end of the voltage sag 506. Given that the resistance $R_S$ is the impedance that is added to the load 633 during the voltage sag 506, the thyristor 626 acts to remove the impedance $R_S$ to resupply the power voltage 500 to the load 633, where the resistance $R_T$ is much less than the resistance $R_S$. Thereafter, the relay 629 is closed so that a direct conductive pathway is established to the load 633 without any loss to either of the resistances $R_S$ or $R_T$.

The current limiting circuit 600 illustrates the operation of an embodiment in which the inrush current that flows to the load 633 is minimized after the end of the voltage sag 506, where the impedance represented by the resistance $R_S$ that was added to the load 633 is removed from the load 633 at approximately the zero crossing of the power voltage 500 after the power voltage 500 has returned to the nominal voltage 509.

The precise zero crossing detected by the zero crossing detector 609 at which the thyristor 626 is turned on may be the first zero crossing that occurs after the power voltage 500 has returned to the nominal voltage 509. Alternatively, the zero crossing at which the thyristor 626 is turned on may be any zero crossing that occurs after the power voltage 500 has returned to the nominal voltage 509 with the understanding that it may be favorable to turn the thyristor 626 on as soon as possible so as to reestablish the power voltage 500 at the load 633 so that the load is not adversely affected.

In addition, the resistance $R_T$ is specified so that the thyristor 626 does not experience currents that are too high that may adversely affect its operation, taking into account how long the thyristor 626 would have to stay on given the zero crossing or other point at which the thyristor 626 would be turned on after the voltage sag 506 has ended.

Referring next to FIG. 15, shown is a current limiting circuit 700 according to another embodiment of the present disclosure. The current limiting circuit 700 is similar in function with respect to the current limiting function 600, except that the resistance $R_S$ is not employed. In this respect, the impedance added to the load 633 is the equivalent of an infinite resistance or an open circuit. In all other ways, the operation of the current limiting circuit 700 is the same as described above with respect to FIG. 15.

In addition, the current limiting circuit 700 provides additional capability in that it can isolate the load 633 from the power voltage 500 such as might be desirable in a case where sustained undervoltages or overvoltages occur that may be dangerous for the load 633. The current limiting circuit 600 (FIG. 15) may also be configured isolate the load 633 in the case of an undervoltage or overvoltage that might present a danger for the load 633 by including a second relay in series with the resistance $R_S$ that would open up to isolate the load 633 from the power voltage 500. In case an undervoltage or overvoltage is detected, a relay may be opened at the same time that the relay 629 is opened.

Figure 17:
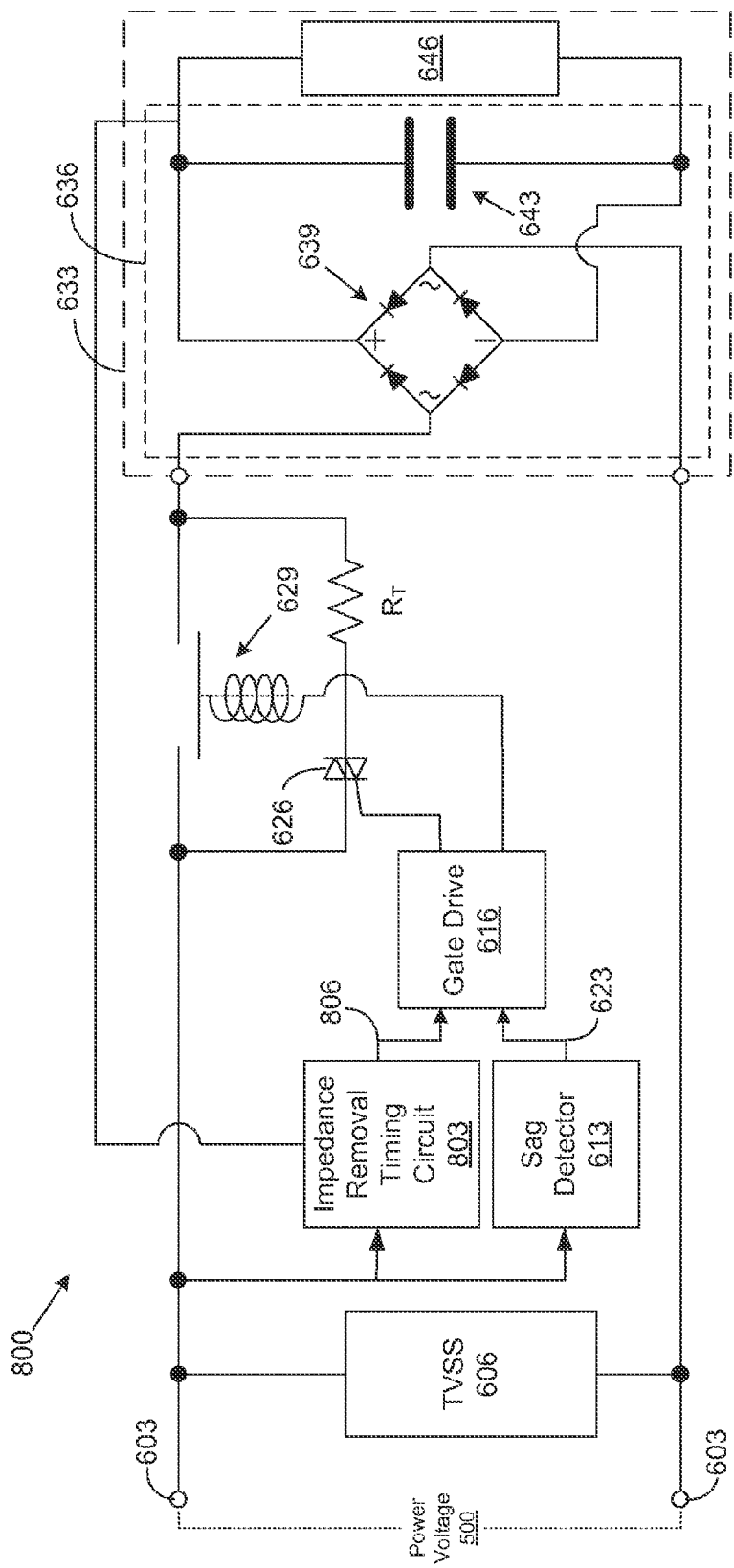
FIG. 17 is a schematic of yet another example of a current limiting circuit that operates to time the removal of a current limiting impedance as illustrated, for example, in FIG. 14 according to an embodiment of the present disclosure.

Turning then to FIG. 17, shown is a current limiting circuit 800 according to yet another embodiment of the present disclosure. The current limiting circuit 800 is similar to the current limiting circuit 700 (FIG. 15) with the exception that the zero crossing detector 609 in the current limiting circuit 700 has been replaced by the impedance removal timing circuit 803 that generates an impedance removal signal 806 that is applied to the gate drive 616. The current limiting circuit 800 operates in much the same way as the current limiting circuit 700 with the exception that the impedance removal timing circuit 803 receives the voltage across the capacitor 643 of the rectifier 636 as an input. This voltage may be compared with the power voltage 500 that is received as another input.

In this respect, the impedance removal timing circuit 803 may send the signal to the gate drive 616 to energize the thyristor 626 to supply current to the load 633 when conditions other than zero crossings occur that will allow the load 633 to be supplied with the line voltage without causing an undesirable inrush current surge. In particular, the conditions may comprise, for example, when the absolute value of the magnitude of the power voltage 500 is less than the magnitude of the rectified voltage across the capacitor 643 associated with the rectifier of the load. In this respect, the voltage differential $V_D$ (FIG. 14) does not exist such that a significant inrush current surge is not likely to be experienced.

Alternatively, the impedance removal timing circuit 803 may generate the impedance removal output signal 806 that causes the gate drive 616 to energize the thyristor 626 to remove the impedance from the load 633 at any point on the power voltage cycle of the power voltage 500 that substantially minimizes a differential between the absolute value of the magnitude of the power voltage 500 and a magnitude of the rectified voltage across the capacitor 643 that is associated with the load.

Figure 18:
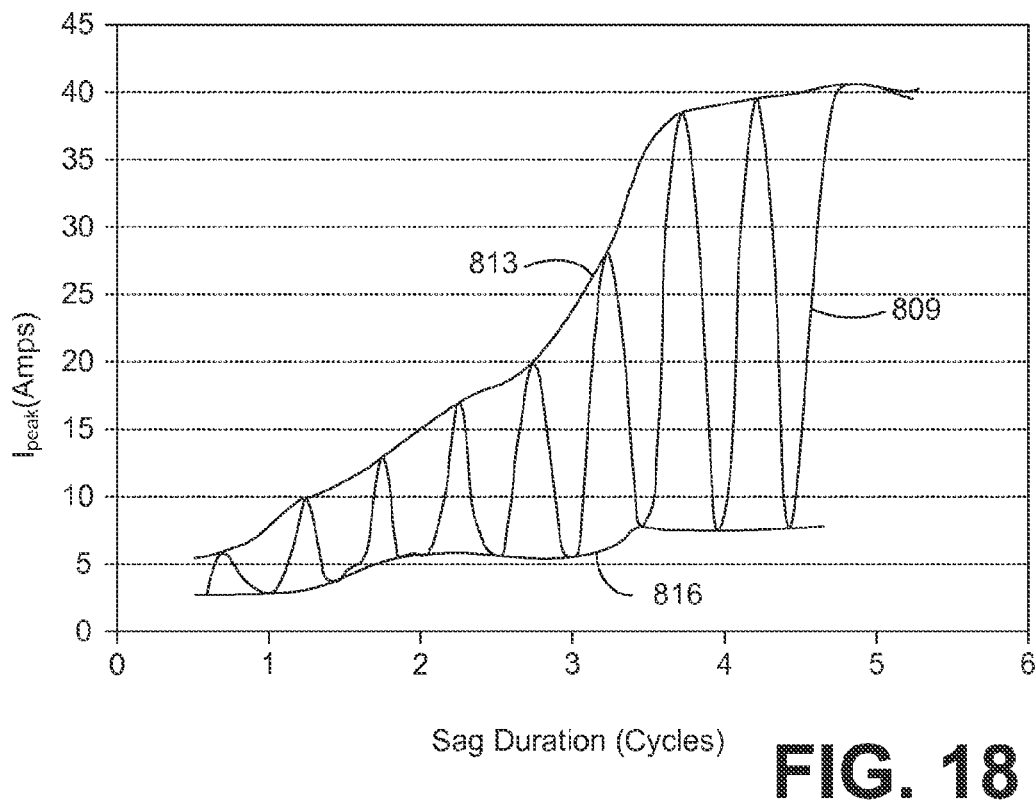
FIG. 18 is a graph that plots one example of an inrush surge current with respect to a duration of a sag in a power voltage such as the voltage sag illustrated in the example depicted in FIG. 14, where the inrush surge current depicted provides one example basis for determining where the current limiting impedance depicted with respect to FIG. 15, 16, or 17 should be removed according to an embodiment of the present disclosure.

Referring next to FIG. 18, shown is a chart that plots an example of the magnitude of the peak value of the inrush current surge that flows into a load as a function of the duration of a voltage sag 506 (FIG. 14) in terms of line voltage cycles. As shown in FIG. 18, the peak value of the measured inrush current surge 809 is depicted for various values of voltage sag duration for a typical liquid crystal monitor load. The inrush current surge 809 has an upper envelope 813, depicting the worst case stresses that are possible, and a lower envelope 816 that shows significantly lower inrush current values that may be achieved when normal load operation is resumed coincident with a line zero voltage crossing. The upper envelope follows the upper peaks of the inrush current surge 809 and the lower envelope 816 follows the lower peaks of the inrush current surge 809.

As can be seen, the peak value of the measured inrush current surge 809 potentially increases in time in proportion with the decay, for example, of the voltage experienced across a capacitor 803 (FIGS. 15-17) during a voltage sag 506. Even with the increase of the size of the peaks of the inrush current surge as the duration of the voltage sag 506 increases, there are still significant valleys and lower currents throughout the voltage sag duration. As such, it is desirable to ensure that the inrush current surge 809 falls at the bottom of a valley of the various peaks shown which generally coincide with the zero crossings of the power voltage 500 as can be appreciated.

Figure 19:
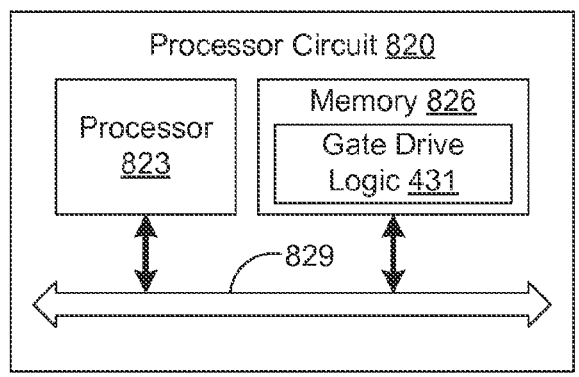
FIG. 19 is a schematic diagram of one example of a processor circuit that executes gate drive logic as employed in the current limiting circuits of FIG. 15, 16, or 17 according to an embodiment of the present disclosure.

Turning then to FIG. 19, shown is a processor circuit according to an embodiment of the present disclosure that provides one example of an implementation of the gate drive 616 according to an embodiment of the present disclosure. As depicted, a processor circuit 820 is shown having a processor 823 and a memory 826, both of which are coupled to a local interface 829. The local interface 829 may comprise, for example, a data bus with an accompanying control/address bus as can be appreciated by those with ordinary skill in the art. In this respect, the processor circuit 820 may comprise any one of a number of different commercially available processor circuits. Alternatively, the processor circuit 820 may be implemented as part of an application specific integrated circuit (ASIC) or may be implemented in some other manner as can be appreciated. It is also possible that the logic control functions can be implemented without a microprocessor.

Stored on the memory 831 and executable by the processor 823 is gate drive logic 831. The gate drive logic 831 is executed to control the function of the gate drive 616 in controlling the opening and dosing of the relay 629, and to turn the thyristor 626 (FIGS. 15-17) on or off. In addition, an operating system may also stored on the memory 826 and executed by the processor 823 as can be appreciated. Still further, other logic in addition to the gate drive logic 831 may be stored in the memory 826 and executed by the processor 823. For example, logic that implements the functions of the zero crossing detector 609 (FIGS. 15 and 16), sag detector 603 (FIG. 15, 16, or 17), or the impedance removal timing circuit 803 (FIG. 17) may be implemented on the processor circuit 820 as can be appreciated. Alternatively, separate processor circuits may be employed to implement each of the gate drive 616, zero crossing detector 609, sag detector 603, or the impedance removal timing circuit 803.

The gate drive logic 831, zero crossing detector 609, sag detector 603, and/or the impedance removal timing circuit 803 (FIG. 17) is described as being stored in the memory 826 and are executable by the processor 823. The term "executable" as employed herein means a program file that is in a form that can ultimately be run by the processor 823. Examples of executable programs may be, for example, a compiled program that can be translated into machine code in a format that can be loaded into a random access portion of the memory 826 and run by the processor 823 or source code that may be expressed in proper format such as object code that is capable of being loaded into a of random access portion of the memory 826 and executed by the processor 823, etc. An executable program may be stored in any portion or component of the memory 826 including, for example, random access memory, read-only memory, a hard drive, compact disk (CD), floppy disk, or other memory components.

The memory 826 is defined herein as both volatile and nonvolatile memory and data storage components. Volatile components are those that do not retain data values upon loss of power. Nonvolatile components are those that retain data upon a loss of power. Thus, the memory 826 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 823 may represent multiple processors and the memory 826 may represent multiple memories that operate in parallel. In such a case, the local interface 829 may be an appropriate network that facilitates communication between any two of the multiple processors, between any processor and any one of the memories, or between any two of the memories etc. The processor 823 may be of electrical, optical, or molecular construction, or of some other construction as can be appreciated by those with ordinary skill in the art.

Figure 20:
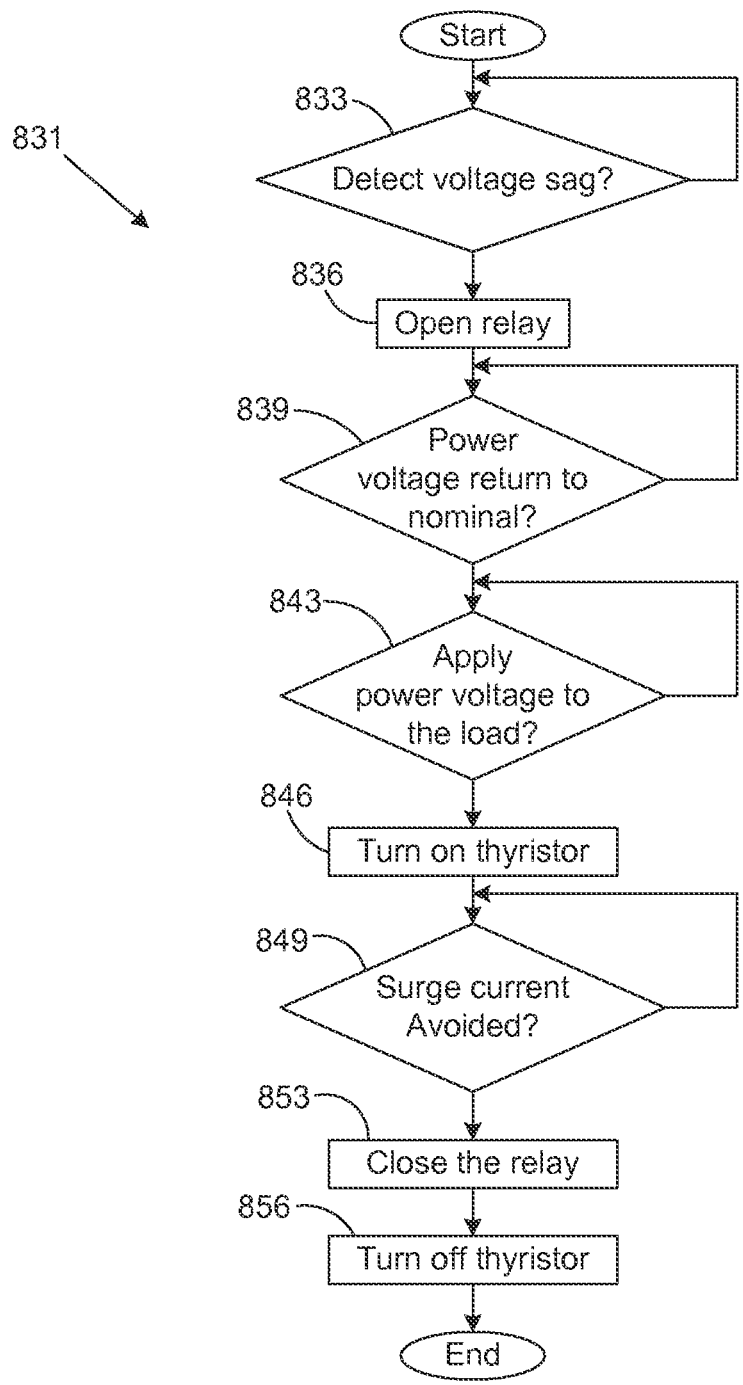
FIG. 20 is a flow chart of one example of the gate drive logic executed in the processor of FIG. 18 according to an embodiment of the present disclosure.

Referring next to FIG. 20, shown is a flow chart that provides one example of the operation of the gate drive logic 831 according to an embodiment of the present disclosure. Alternatively, the flow chart of FIG. 20 may be viewed as depicting steps of an example of a method implemented by the processor circuit 820 to prevent an inrush current surge to the load 633 (FIGS. 15-17) after a voltage sag 506 (FIG. 14). The functionality of the gate drive logic 831 as depicted by the example flow chart of FIG. 20 may be implemented, for example, in an object oriented design or in some other programming architecture. Assuming the functionality is implemented in an object oriented design, then each block represents functionality that may be implemented in one or more methods that are encapsulated in one or more objects. The gate drive logic 831 may be implemented using any one of a number of programming languages as can be appreciated.

Figure 16:
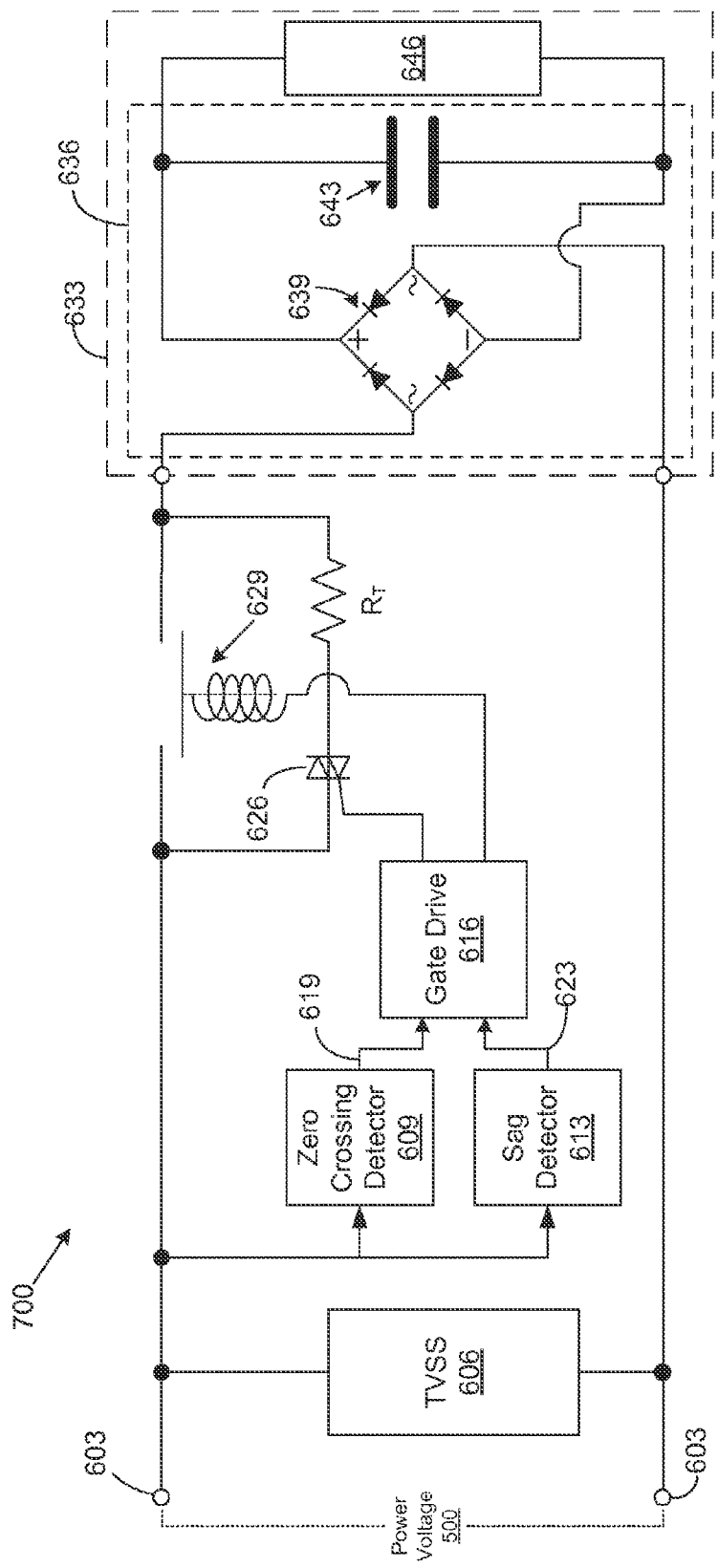
FIG. 16 is a schematic of another example of a current limiting circuit that operates to time the removal of a current limiting impedance as illustrated for example, in FIG. 14 according to an embodiment of the present disclosure.

Beginning with box 833, the gate drive logic 831 determines whether a voltage sag 506 has been detected. This may be determined by examining the output of the sag detector 613 (FIGS. 15-17) as described above. Assuming that a voltage sag 506 has been detected, then in box 836 the relay 629 (FIGS. 15-17) is opened thereby disrupting the flow of current through the relay 629 to the load 633 (FIGS. 15-17). As such, any reduced current flowing to the load (due to the voltage sag 506) flows to the load 633 through the resistor $R_S$ or does not flow at all as is the case, for example, with the current limiting circuit 700 (FIG. 15). Next, in box 839, the gate drive logic 831 determines whether the power voltage 500 (FIG. 14) has returned to a nominal value. This may be determined based upon a signal 623 (FIGS. 15-17) received from the sag detector 613 that indicates that the voltage sag 506 has ended.

Assuming that such is the case, then the gate drive logic 831 proceeds to box 843 in which it is determined whether to apply the power voltage 500 (FIG. 14) to the load 633. In this respect, the gate drive logic 831 waits for the optimal time to return the power voltage 500 to the load so as to minimize the potential inrush current to the load 633. This determination may be made by examining the output from either the zero crossing detector 609 or the impedance removal timing circuit 803 (FIG. 17) as described above. The zero crossing detector 609 or the impedance removal timing circuit 803 provide a signal 619 or 806 that indicates when the thyristor 626 should be turned on in order to provide current to the load 633 as described above.

Alternatively, the relay 629 may be turned on in box 846 instead of a thyristor 626 where the actual closing of the relay 629 may be timed so as to coincide with a zero crossing or other location on the power voltage cycle, for example, where the future zero crossing or other location on the power voltage cycle can be predicted given a known response time of the relay 629 itself. As such, the gate drive logic 831 would end if the relay 629 is turned on in box 846, However, it should be noted that the relay might be inconsistent in its response time, thereby resulting in variation in when it will actually close and couple the power voltage 500 to the load 633. Thus, the reduction of any inrush current may be adversely affected to some degree.

However, assuming that the thyristor 626 is turned on in box 846, then the gate drive logic 831 proceeds to box 849 to determine whether the surge current has been avoided. This may be determined by allowing a certain period of time to pass within which it is known that any potential current surge is likely to be dissipated.

Then, in box 853, the relay 629 is closed, thereby providing power to the load 633 through the relay 629. Once the relay is closed, then in box 856 the thyristor 626 is turned off since the load 633 is now being supplied through the relay 629. Thereafter the gate drive logic 831 ends as shown.

While the gate drive logic 831, zero crossing detector 609, sag detector 603, and/or the impedance removal timing circuit 803 (FIG. 17) may be embodied in software or code executed by general purpose hardware as discussed above, as an alternative the same may also be embodied in dedicated hardware or a combination of software/general purpose hardware and dedicated hardware. If embodied in dedicated hardware, the gate drive logic 831, zero crossing detector 609, sag detector 603, and/or the impedance removal timing circuit 803 (FIG. 17) can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 20 shows the architecture, functionality, and operation of an example implementation of the gate drive logic 831. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow chart of FIG. 20 shows a specific order of execution, it is understood that the order of execution may differ from that which is depicted. For example, the order of execution of two or more blocks may be scrambled relative to the order shown. Also, two or more blocks shown in succession in FIG. 20 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the gate drive logic 831, zero crossing detector 609, sag detector 603, and/or the impedance removal timing circuit 803 (FIG. 17) comprises software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the gate drive logic 831, zero crossing detector 609, sag detector 603, and/or the impedance removal timing circuit 803 (FIG. 17) for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A voltage surge and overvoltage protection system, comprising:
    at least one first voltage clamping device configured to clamp a voltage of an input power voltage applied to an electrical load to a predetermined first voltage clamping level;
    at least one second voltage clamping device configured to clamp the voltage applied to the electrical load to a predetermined second voltage clamping level;
    a selectably actuatable switch connected between the first voltage clamping device and the second voltage clamping device for disconnecting power from the second voltage clamping device and the electrical load; and
    a switch control circuit that controls actuation of the switch in response to detection that the input power voltage has exceeded a predetermined voltage level for a predetermined time.

2. The system of claim 1, wherein the at least one first voltage clamping device comprises a metal-oxide varistor.

3. The system of claim 1, wherein the at least one second voltage clamping device further comprises a metal-oxide varistor.

4. The system of claim 1, wherein the selectively actuatable switch comprises a relay.

5. The system of claim 1, wherein a clamping voltage of the at least one first voltage clamping device is substantially higher than a clamping voltage of the at least one second voltage clamping device.

6. The system of claim 1, wherein the switch is actuatable between a first state in which the switch establishes a direct coupling of the input power to the electrical load; and a second state in which the direct coupling is opened.

7. The system of claim 6, further comprising a series impedance coupled in parallel with the switch, where the switch presents a path of least resistance that bypasses the series impedance when the switch is in the first state.

8. The system of claim 6, where the switch further couples a shunt resistance across the electrical load in the second state.

9. The system of claim 6, further comprising an impedance switch configured to add an impedance to the electrical load, where the switch control circuit further controls the operation of the impedance switch.

10. The system claim 9, where the switch is in parallel with the impedance switch, where the impedance is configured to minimize a voltage across the switch when added to the electrical load; and the switch control circuit is configured to sequence a manipulation of the switch and the impedance switch in order to open the direct coupling so as to minimize a potential tier physical damage to the switch due to sparking.

11. A method for providing voltage surge and overvoltage protection to an electrical load, comprising the steps of:
    applying an input power voltage to the electrical load;
    providing a first parallel clamping device and a second parallel clamping device between the input power voltage and the electrical load;
    distributing a dissipation of an overvoltage experienced in the input power voltage among the first parallel clamping device and the second parallel clamping device
    monitoring the voltage of the input power voltage for an overvoltage having a magnitude and duration exceeding a predetermined voltage-time threshold;
    maintaining a direct coupling of the input power voltage to the electrical load through the first and second clamping devices so long as the magnitude and a diaration of the overvoltage are less than said voltage-time threshold; and
    disconnecting the direct coupling of the input power voltage to the electrical load by opening a switch connected between the first parallel clamping device and the second parallel clamping device in response to detection that the magnitude and duration of the overvoltage are greater than said voltage-time threshold.

12. The method of claim 11, where the at least one predefined voltage-time threshold further comprises a plurality of predefined voltage-time thresholds, the method further comprising the steps of:
    storing the predefined voltage-time thresholds in a memory;
    monitoring the power voltage to identify the over voltaae; and
    timing a duration of the overvoltage.

13. The method of claim 11, wherein the switch is an isolation relay, and wherein the step of disconnecting the direct coupling of the power voltage to the electrical load comprises the step of switching the isolation relay from a first state to a second state, where the relay couples the power voltage directly to the electrical load in the first state.

14. The method of claim 13, further comprising the step of completely isolating the electrical load from the input power when the isolation relay is in the second state.

15. The method of claim 13, where the electrical load is partially isolated from the input power when the isolation relay is in the second state, where the isolation relay is coupled in parallel to an impedance.

16. The method of claim 11, further comprising the step of adding an impedance to the electrical load when the power voltage experiences a voltage sag during a steady-state operation of the electrical load.

17. The method of claim 16, further comprising the step of removing the impedance from the electrical load when the power voltage has reached a predefined point in the power voltage cycle after the power voltage has returned to a nominal state.

18. The system of claim 5, wherein a clamping voltage of the at least one first voltage clamping device is at least twice as high as a clamping voltage of the at least one second voltage clamping device.

19. The method of claim 11, wherein a clamping voltage of the first parallel clamping device is substantially higher than a clamping voltage of he second parallel clamping device.

20. The method of claim 19, wherein a clamping voltage of the first parallel clamping device is at least twice as high as a clamping voltage of the second parallel clamping device.

21. An apparatus for protecting an electrical load from transient voltage surges and overvoltages when connected to an input power voltage, comprising:
   at least one first voltage clamping device connected to the input power voltage configured to clamp the voltage of the input power voltage to a first predetermined clamping level;
   at least one second voltage clamping device connected to the electrical load configured to clamp the voltage applied to the electrical load to a second predetermined clamping level lower than said first predetermined clamping level, in parallel arrangement with said first clamping device;
   a voltage detector circuit that provides a control signal representing tle input power voltage;
   a processor circuit operative to provide a switching signal in response to a determination that the control signal from the voltage detector circuit indicates that the input power voltage exceeds a predetermined threshold for a predetermined duration of time;
   a switch responsive to the switching signal from the processor circuit to switch between (i) a first state in which the input power voltage is directly coupled to the electrical load and first clamping device and (ii) a second state in which the direct coupling is opened and a shunt resistance is connected in parallel with the load and the second clamping device.

22. The apparatus of claim 21, wherein the voltage detector is connected to measure the input power voltage at a point prior to a terminal of the switch.

23. The apparatus of claim 21, wherein the clamping level of the first voltage clamping device is approxi ately five nes the nominal input power voltage.

24. The apparatus of claim 21, wherein the clamping level he first voltage clamping device is substantially higher than the clamping level of the second voltage clamping device.

25. The apparatus of claim 24, wherein in the clamping level of the first voltage clamping device is approximately twice as high as the clamping level of the second voltage clamping device.

26. The apparatus of claim 21, Therein the processor stores a plurality of voltage-time curves representing predefined voltage-time thresholds utilized for controlling the operation of the switch.

27. The apparatus of claim 21, wherein the processor is a programmed microprocessor.

28. The apparatus of claim 21, wherein the first voltage clamping device is a metal-oxide varistor.

29. The apparatus of claim 21, wherein the second voltage clamping device is a metal-oxide varistor.

30. The apparatus of claim 21, wherein the switch is a first switch, and further comprising a second switch responsive to a second switching signal from the processor circuit, the second switch coupling an impedance between the input power voltage and the electrical load, the second switch operative to switch between (i) a first state in which the input power voltage is coupled to the electrical load through the impedance and (ii) a second state in which the impedance is not connected to the electrical load.

31. The apparatus of claim 21, wherein the processor circuit provides the second switching signal to place the second switch into the first state in response to detection of a voltage sag of a predetermined voltage and duration, so as to couple the impedance between the input power voltage and the electrical load to reduce inrush current when the input power voltage returns to a nominal level.

32. The apparatus of claim 4, wherein the relay comprises a double pole relay.

33. The apparatus of claim 32, wherein the double pole relay is a double pole, double throw (DPDT) relay, and wherein the first pole of the relay is used for disconnecting power from the second voltage clamping device and the electrical load, and the second pole is used to impose an impedance between the first clamping device and the second clamping device and electrical load in response to the switch control circuit.

34. The apparatus of claim 33, wherein the switch control circuit controls actuation of the first pole of the relay independently of the second pole of the relay.

35. The method of claim 13, wherein the isolation relay comprises a double pole relay.

36. The method of claim 35, wherein the doable pole relay is a doable pole, double throw (DPDT) relay, and further comprising the steps of:
   disconnecting power from the second voltage clamping device and the electrical load using the first pole of the relay in the first state, and
   imposing an impedance between the first clamping device and the second clamping device and electrical load using the second pole of the relay.

37. The method of claim 35, further comprising the step of imposing an impedance between the first clamping device and the second clamping device to limit inrush current during power up of the load.

38. The apparatus of claim 1, wherein the switch control circuit is a programmed microprocessor.

* * * * *